US012565759B2

(12) United States Patent
Fukuda

(10) Patent No.: US 12,565,759 B2
(45) Date of Patent: Mar. 3, 2026

(54) HYDRAULIC SYSTEM FOR WORKING MACHINE

(71) Applicant: KUBOTA CORPORATION, Osaka (JP)

(72) Inventor: Yuji Fukuda, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 250 days.

(21) Appl. No.: 18/071,676

(22) Filed: Nov. 30, 2022

(65) Prior Publication Data

US 2023/0203787 A1 Jun. 29, 2023

(30) Foreign Application Priority Data

Dec. 28, 2021 (JP) ................................ 2021-214869

(51) Int. Cl.

*E02F 9/22* (2006.01)
*F15B 11/16* (2006.01)
*F15B 11/17* (2006.01)

(52) U.S. Cl.

CPC .......... *E02F 9/2228* (2013.01); *E02F 9/2235* (2013.01); *E02F 9/2285* (2013.01); *E02F 9/2292* (2013.01); *E02F 9/2296* (2013.01); *F15B 11/17* (2013.01); *F15B 11/165* (2013.01); *F15B 2211/20553* (2013.01); *F15B 2211/20576* (2013.01); *F15B 2211/253* (2013.01); *F15B 2211/329* (2013.01); *F15B 2211/6355* (2013.01); *F15B 2211/6652* (2013.01); *F15B 2211/71* (2013.01)

(58) Field of Classification Search

None
See application file for complete search history.

(56) References Cited

U.S. PATENT DOCUMENTS 4,167,853 A * 9/1979 Hamma ................ F16H 61/465 60/329
4,426,194 A * 1/1984 Pollman ................ F15B 21/045 60/329

(Continued)

FOREIGN PATENT DOCUMENTS

JP 2002194776 A * 7/2002
JP 2016-125560 A 7/2016

OTHER PUBLICATIONS

JP-2002194776-A machine translation to English from PE2Esearch (Year: 2024).*

*Primary Examiner* — Michael Quandt
(74) *Attorney, Agent, or Firm* — Keating & Bennett, LLP

(57) ABSTRACT

A hydraulic system for a working machine includes a prime mover, a boom cylinder, a control valve, a first hydraulic pump to deliver pilot fluid to switch the control valve, a second hydraulic pump to deliver hydraulic fluid to activate the boom cylinder, a hydraulic controller configured or programmed to control the second hydraulic pump to set a load-sensing (LS) differential pressure, a first pilot fluid passage, a second pilot fluid passage branching off from the first pilot fluid passage and connected to the hydraulic controller, a solenoid valve to change a pilot pressure that is a pressure of the pilot fluid applied to the hydraulic controller, and a pressure compensator to increase the LS differential pressure as a temperature of the hydraulic fluid including the pilot fluid decreases.

20 Claims, 16 Drawing Sheets

(56) References Cited

U.S. PATENT DOCUMENTS

| | | | | |
|---|---|---|---|---|
| 8,701,399 | B2 * | 4/2014 | Horii | E02F 9/2296 60/486 |
| 9,200,431 | B2 * | 12/2015 | Mori | E02F 9/2296 |

* cited by examiner

| Engine rotational speed [rpm] | LS differential pressure [MPa] | Pump delivery amount [LPM] (with spool opening constant) |
|---|---|---|
| 1200 | 0.40 | 52 |
| 1400 | 0.51 | 58 |
| 1600 | 0.63 | 65 |
| 1800 | 0.77 | 72 |
| 2000 | 0.93 | 79 |
| 2200 | 1.10 | 86 |
| 2400 | 1.29 | 93 |
| 2600 | 1.50 | 100 |

Fig.2B

| Engine rotational speed [rpm] | Without change command | | With change command | |
|---|---|---|---|---|
| | LS differential pressure [MPa] | Pump delivery amount [LPM] (with spool open constant) | LS differential pressure [MPa] | Pump delivery amount [LPM] (with spool open constant) |
| 1200 | 0.40 | 52 | 0.60 | 63 |
| 1400 | 0.51 | 58 | 0.71 | 69 |
| 1600 | 0.63 | 65 | 0.83 | 74 |
| 1800 | 0.77 | 72 | 0.97 | 80 |
| 2000 | 0.93 | 79 | 1.13 | 87 |
| 2200 | 1.10 | 86 | 1.30 | 93 |
| 2400 | 1.29 | 93 | 1.49 | 99 |
| 2600 | 1.50 | 100 | 1.70 | 106 |

Fig.4B

| Operation amount of one accelerator member [%] (operation amount of other accelerator member is maximum or predetermined amount or more) | LS differential pressure [MPa] | Pump delivery amount [LPM] (with spool opening constant) |
|---|---|---|
| 0 | 1.50 | 100 |
| 10 | 1.50 | 100 |
| 30 | 1.54 | 101 |
| 50 | 1.61 | 104 |
| 70 | 1.70 | 106 |
| 90 | 1.80 | 110 |
| 100 | 1.80 | 110 |

Fig.6

HYDRAULIC SYSTEM FOR WORKING MACHINE

CROSS REFERENCE TO RELATED APPLICATIONS

This application claims the benefit of priority to Japanese Patent Application No. 2021-214869 filed on Dec. 28, 2021. The entire contents of this application are hereby incorporated herein by reference.

BACKGROUND OF THE INVENTION

1. Field of the Invention

The present invention relates to a hydraulic system for a working machine such as a skid-steer loader or a compact track loader, and a working machine including the hydraulic system.

2. Description of the Related Art

In the related art, there is known a working machine equipped with a load sensing system that controls the delivery amount of hydraulic fluid to be delivered from a hydraulic pump in accordance with a work load.

For example, a working machine disclosed in Japanese Unexamined Patent Application Publication No. 2016-125560 includes a first hydraulic pump that delivers pilot fluid to switch a control valve that controls activation of a hydraulic actuator, a second hydraulic pump that delivers hydraulic fluid to activate the hydraulic actuator, a first fluid passage on which the highest load pressure when the hydraulic actuator is in operation can act, a second fluid passage on which a delivery pressure of the hydraulic fluid from the second hydraulic pump can act, a pilot fluid passage to which the pilot fluid is delivered from the first hydraulic pump, and a hydraulic control unit that controls the second hydraulic pump.

The hydraulic control unit controls the delivery amount of the hydraulic fluid from the second hydraulic pump so that a load-sensing (LS) differential pressure between the highest load pressure acting on the first fluid passage and the delivery pressure of the hydraulic fluid from the second hydraulic pump acting on the second fluid passage is kept constant. Further, the hydraulic control unit performs control of the delivery amount of the hydraulic fluid from the second hydraulic pump, called throttle-type gain control, on the basis of a differential pressure of a throttle in a pilot fluid passage (i.e., a differential pressure between a first pressure of the pilot fluid extracted from an upstream-side end of the throttle (a first extractor) and a second pressure of the pilot fluid extracted from a downstream-side end of the throttle (a second extractor)) to perform horsepower control of the first hydraulic pump to reduce horsepower loss.

SUMMARY OF THE INVENTION

The delivery amount of the hydraulic fluid from the second hydraulic pump (LS pump) is adjusted such that the LS differential pressure is kept constant. Depending on the temperature of the hydraulic fluid, the delivery flow rate of the pump may change even when the LS differential pressure is kept constant for a determined opening area of a spool. The reason for this is as follows. Since a change in the temperature of the hydraulic fluid may cause a change in the viscosity of the hydraulic fluid, the flow rate of the hydraulic fluid passing through the opening of the spool may change even if the opening area of the spool is constant and the LS differential pressure is constant. In the throttle-type gain control described above, the differential pressure across the throttle increases when the temperature of the hydraulic fluid becomes low. Thus, the LS differential pressure is set to be higher in a low-temperature period than in a room-temperature or high-temperature period such that the delivery from the second hydraulic pump can be less affected by temperature. By contrast, horsepower control using a proportional valve in place of the throttle may cause a decrease in the delivery amount of the hydraulic fluid from the second hydraulic pump in the low-temperature period and an increase in the delivery amount of the hydraulic fluid from the second hydraulic pump in the high-temperature period. In actual horsepower control using a proportional valve, therefore, it is difficult to perform temperature correction of pilot pressure.

Preferred embodiments of the present invention provide hydraulic systems for working machines to perform horsepower control by using proportional valves, in which temperature correction of pilot pressure can be performed with a simple configuration and accuracy of horsepower control can be improved.

Preferred embodiments of the present invention provide the technical solutions as follows.

A hydraulic system for a working machine according to an aspect of a preferred embodiment of the present invention includes a prime mover, a hydraulic actuator, a control valve to control activation of the hydraulic actuator, a first hydraulic pump to be driven by power of the prime mover to deliver pilot fluid to switch the control valve, a second hydraulic pump to be driven by power of the prime mover to deliver hydraulic fluid to activate the hydraulic actuator, the second hydraulic pump being a variable displacement hydraulic pump, a hydraulic controller to control the second hydraulic pump to set a load-sensing (LS) differential pressure, the LS differential pressure being a pressure difference between a delivery pressure of the hydraulic fluid from the second hydraulic pump and a highest load pressure of the hydraulic fluid when the hydraulic actuator is in operation, a first pilot fluid passage through which the pilot fluid delivered from the first hydraulic pump flows, a second pilot fluid passage branching off from the first pilot fluid passage and connected to the hydraulic controller, a solenoid valve in the second pilot fluid passage to change a pilot pressure of the pilot fluid applied to the hydraulic controller, and a pressure compensator located between the solenoid valve and the hydraulic controller to increase the LS differential pressure as a temperature of the hydraulic fluid including the pilot fluid decreases.

The pressure compensator may include a discharge fluid passage branching off from the second pilot fluid passage at a branch point between the solenoid valve and the hydraulic controller to discharge the pilot fluid, a first throttle in the second pilot fluid passage between the solenoid valve and the branch point, and a second throttle in the discharge fluid passage with a different flow rate characteristic from the first throttle.

The first throttle and the second throttle may be different in at least one of throttle hole diameter or throttle length.

The first throttle and the second throttle may be each a choke throttle, and may be different in at least one of choke inside diameter or choke length, the choke inside diameter being a throttle hole diameter, the choke length being a throttle length.

The first throttle and the second throttle may be each an orifice throttle, and may be different in at least one of orifice diameter or orifice blade length, the orifice diameter being the throttle hole diameter, the orifice blade length being the throttle length and being a length of a portion with a narrowed diameter.

One of the first throttle and the second throttle may be a choke throttle, and the other may be an orifice throttle.

The first throttle may be a choke throttle, and the second throttle may be an orifice throttle.

The hydraulic system for the working machine may further include a first fluid passage to receive the highest load pressure of the hydraulic fluid when the hydraulic actuator is in operation, a second fluid passage to receive the delivery pressure of the hydraulic fluid from the second hydraulic pump, and an electrical controller configured or programmed to control activation of the solenoid valve to adjust the pilot pressure to change the LS differential pressure.

The controller may be configured or programmed to control activation of the solenoid valve to change a pilot differential pressure, the pilot differential pressure being a pressure difference between a first pressure of the pilot fluid flowing into the solenoid valve and a second pressure of the pilot fluid output from the solenoid valve.

The hydraulic system for the working machine may further include a first throttle disposed in the second pilot fluid passage between the solenoid valve and the hydraulic controller. The controller may be configured or programmed to change the pilot differential pressure. The pressure compensator may change a differential pressure between the second pressure and a third pressure of the pilot fluid output from the first throttle as a temperature of the pilot fluid decreases.

The first hydraulic pump may be a fixed-displacement hydraulic pump with a delivery flow rate that varies in accordance with a rotational speed of the prime mover. The hydraulic controller may include a swash plate adjuster to change an angle of a swash plate included in the second hydraulic pump, a flow rate compensation valve connected to the first fluid passage to supply the hydraulic fluid to the swash plate adjuster to activate the swash plate adjuster, and an opening adjuster connected to the second pilot fluid passage to change an opening of the flow rate compensation valve. The electrical controller may be configured or programmed to control activation of the solenoid valve to cause the opening adjuster to change the opening of the flow rate compensation valve to change the LS differential pressure.

The pressure compensator may, in response to a change in a temperature of the pilot fluid to a second temperature lower than a first temperature, change the pilot pressure to a pilot pressure for the second temperature, the pilot pressure for the second temperature being higher than a pilot pressure for the first temperature. The opening adjuster may change the opening of the flow rate compensation valve in accordance with the pilot pressure for the second temperature to which the pilot pressure is changed by the pressure compensator. The flow rate compensation valve may activate the swash plate adjuster so as to change the angle of the swash plate in accordance with the changed opening to change a delivery amount of the hydraulic fluid from the second hydraulic pump.

The hydraulic system for the working machine may further include a first measurement device to measure an actual rotational speed of the prime mover. The electrical controller may be configured or programmed to change the LS differential pressure, based on the actual rotational speed measured by the first measurement device.

The hydraulic system for the working machine may further include a first measurement device to measure an actual rotational speed of the prime mover. The electrical controller may be configured or programmed to change the LS differential pressure, based on a difference between the actual rotational speed measured by the first measurement device and a predetermined target rotational speed.

The hydraulic system for the working machine may further include a first measurement device to measure an actual rotational speed of the prime mover. The electrical controller may be configured or programmed to decrease the LS differential pressure when the actual rotational speed measured by the first measurement device is lower than a predetermined target rotational speed.

The prime mover may be an internal combustion engine drivable by combustion of injected fuel. The controller may be configured or programmed to change the LS differential pressure, based on an injection amount of fuel to the internal combustion engine or a load factor of the internal combustion engine.

The hydraulic system for the working machine may further include a command generator to provide a command to change the LS differential pressure. The electrical controller may be configured or programmed to change the LS differential pressure such that the LS differential pressure is increased in response to a command being generated by the command member to change the LS differential pressure.

The hydraulic system for the working machine may further include an accelerator to set a rotational speed of the prime mover. The accelerator may also define an instruction generator. The electrical controller may be configured or programmed to determine a set value of the rotational speed of the prime mover in accordance with an operating state of the accelerator member, and change the LS differential pressure, based on the determined set value.

The hydraulic system for the working machine may further include a second measurement device to measure a temperature of at least one selected from a group consisting of the hydraulic fluid flowing through a flow path disposed in the working machine, cooling water flowing through a water passage disposed in the working machine, and oil of the prime mover. The electrical controller may be configured or programmed to change the LS differential pressure, based on the temperature measured by the second measurement device.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 2B is a table illustrating the relationship among the engine rotational speed, the LS differential pressure, and the pump delivery amount according to the first preferred embodiment of the present invention.

FIG. 4B is a table illustrating the relationship among the engine rotational speed, the LS differential pressure, and the pump delivery amount according to the second preferred embodiment of the present invention.

FIG. 6 is a table illustrating the relationship among the amount of operation of one of the two accelerator members when the amount of operation of the other accelerator member is the maximum amount or is the predetermined amount or more, the LS differential pressure, and the pump delivery amount according to the third preferred embodiment of the present invention.

DETAILED DESCRIPTION OF THE PREFERRED EMBODIMENTS

Figure 1A:
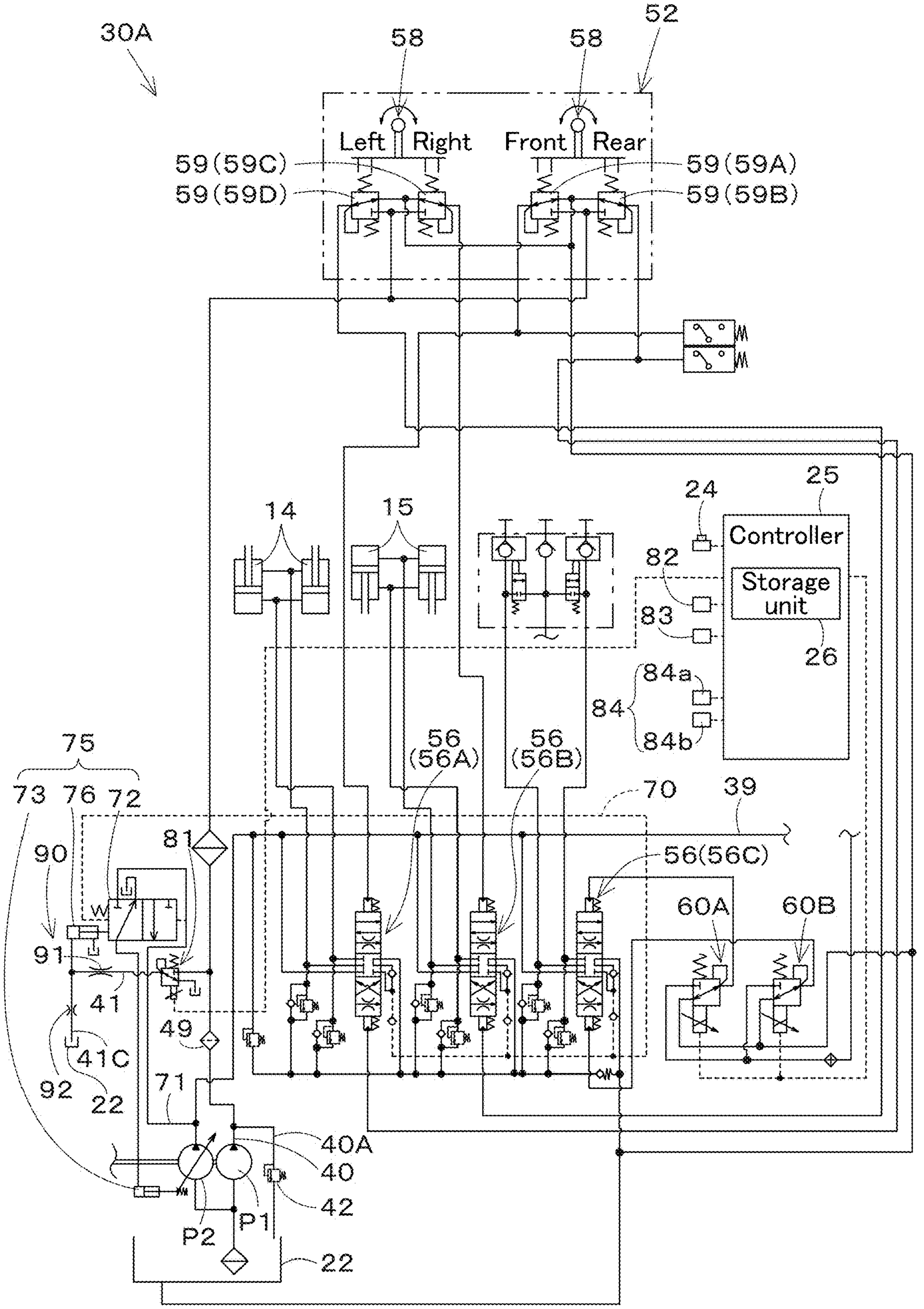
FIG. 1A is an overall view of a hydraulic system for a working system of a working machine according to a first preferred embodiment of the present invention.

The preferred embodiments will now be described with reference to the accompanying drawings, wherein like reference numerals designate corresponding or identical elements throughout the various drawings. The drawings are to be viewed in an orientation in which the reference numerals are viewed correctly.

Hydraulic systems for working machines and working machines including the hydraulic systems according to preferred embodiments of the present invention will be described hereinafter with reference to the drawings as appropriate.

Figure 9:
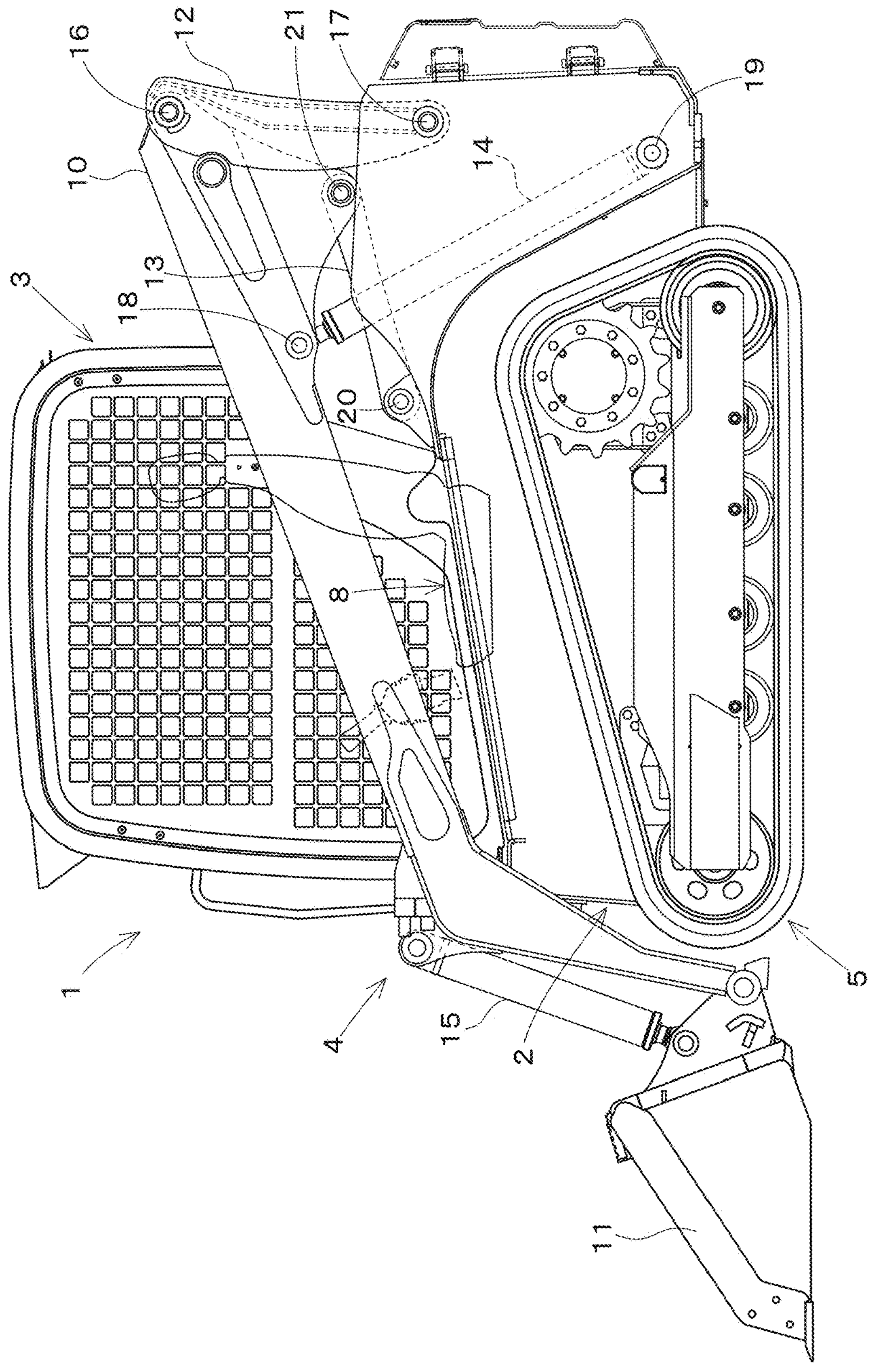
FIG. 9 is a side view of a working machine according to preferred embodiments of the present invention.

FIG. 9 is a side view of a working machine 1 according to a preferred embodiment of the present invention. The working machine 1 includes a machine body 2, a cabin 3, a working device 4, and at least one traveling device 5. In the present preferred embodiment, a compact track loader is presented as an example of the working machine 1. In some preferred embodiments of the present invention, the working machine 1 is not limited to the compact track loader and may be a tractor, a skid-steer loader, or a backhoe, for example.

The cabin 3 is mounted on the machine body 2. The cabin 3 includes an operator's seat 8. A direction ahead of an operator seated on the operator's seat 8 of the working machine 1 (a direction on the left side in FIG. 9) is defined as a front or forward direction, a direction behind the operator (a direction on the right side in FIG. 9) is defined as a rear or rearward direction, a direction to the left of the operator (a direction closer to the viewer in FIG. 9) is defined as a left direction, and a direction to the right of the operator (a direction farther away from the viewer in FIG. 9) is defined as a right direction.

Figure 10:
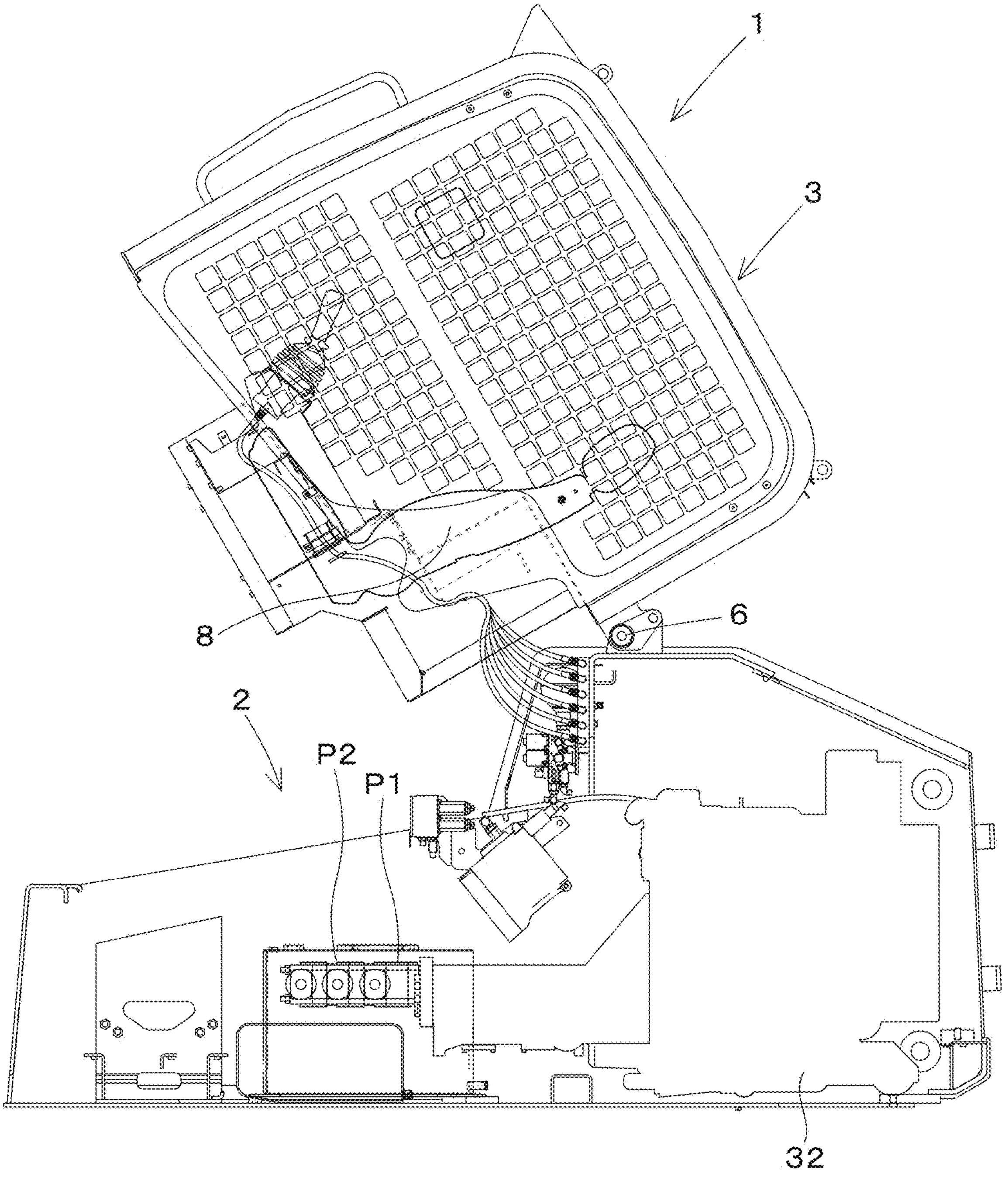
FIG. 10 is a side view of the working machine according to the preferred embodiments of the present invention, illustrating an internal structure of a machine body of the working machine.

FIG. 10 is a side view of the working machine 1, illustrating an internal structure of the machine body 2 of the working machine 1. As illustrated in FIG. 10, the cabin 3 is coupled to the machine body 2 by a coupling shaft 6 or the like and is rotatable upward about the coupling shaft 6.

The machine body 2 has mounted therein at least one hydraulic pump (for example, a first hydraulic pump P1 and a second hydraulic pump P2) and a prime mover (for example, an engine 32). The prime mover includes the engine 32 (diesel engine or gasoline engine), which is an internal combustion engine to be driven by petroleum-based fuel. In another example, the prime mover may include an electric motor to be driven by electric power. In this preferred embodiment, the prime mover will be described as the engine 32.

In FIG. 9, the working device 4 is attached to the machine body 2. The working device 4 includes at least one boom 10, a bucket 11, at least one lift link 12, at least one control link 13, at least one boom cylinder 14, and at least one bucket cylinder 15. The bucket 11 is an example of a working tool.

The at least one boom 10 includes right and left booms 10 disposed on the right and left sides of the cabin 3, respectively, so as to be swingable up and down. The bucket 11 is disposed at distal ends (front ends) of the booms 10 so as to be swingable up and down. The at least one lift link 12 and the at least one control link 13 support base portions (rear portions) of the booms 10.

Front portions of the left and right booms 10 are coupled to each other by an odd-shaped coupling pipe. The base portions (rear portions) of the booms 10 are coupled to each other by a circular-shaped coupling pipe.

The at least one lift link 12, the at least one control link 13, and the at least one boom cylinder 14 include lift links 12, control links 13, and boom cylinders 14 disposed on the left and right sides of the machine body 2 such that the lift link 12, the control link 13, and the boom cylinder 14 on the left side of the machine body 2 correspond to the left boom 10 and the lift link 12, the control link 13, and the boom cylinder 14 on the right side of the machine body 2 correspond to the right boom 10.

Each of the lift links 12 is disposed upright at the rear portion of the base portion of the corresponding one of the booms 10. An upper portion of the lift link 12 is located in the rear portion of the base portion of the corresponding one of the booms 10 and is pivotally supported through a pivot shaft (a first pivot shaft 16) so as to be rotatable about a lateral axis defined by the first pivot shaft 16. A lower portion of the lift link 12 is located in a rear portion of the machine body 2 and is pivotally supported through a pivot shaft (a second pivot shaft 17) so as to be rotatable about a lateral axis defined by the second pivot shaft 17. The second pivot shaft 17 is disposed below the first pivot shaft 16.

An upper portion of each of the boom cylinders 14 is pivotally supported through a pivot shaft (a third pivot shaft 18) so as to be rotatable about a lateral axis defined by the third pivot shaft 18. The third pivot shaft 18 is disposed in a front portion of the base portion of the corresponding one of the booms 10. A lower portion of the boom cylinder 14 is pivotally supported through a pivot shaft (a fourth pivot shaft 19) so as to be rotatable about a lateral axis defined by the fourth pivot shaft 19. The fourth pivot shaft 19 is disposed in a lower portion of the rear portion of the machine body 2 and below the third pivot shaft 18.

The control link 13 is disposed in front of the lift link 12. One end of the control link 13 is pivotally supported through a pivot shaft (a fifth pivot shaft 20) so as to be rotatable about a lateral axis defined by the fifth pivot shaft 20. The fifth pivot shaft 20 is disposed in the machine body 2 at a position in front of the lift link 12. The other end of the control link 13 is pivotally supported through a pivot shaft (a sixth pivot shaft 21) so as to be rotatable about a lateral axis defined by the sixth pivot shaft 21. The sixth pivot shaft 21 is disposed in a portion of the corresponding one of the booms 10 in front of the second pivot shaft 17 and above the second pivot shaft 17.

In response to extension or contraction of each of the boom cylinders 14, the lift link 12 and the control link 13 allow the corresponding one of the booms 10 to swing up or down around the first pivot shaft 16 while supporting the base portion of the boom 10. As a result, the distal end of the boom 10 is raised or lowered. As the boom 10 swings up and down, the control link 13 swings up and down around the fifth pivot shaft 20. As the control link 13 swings up and down, the lift link 12 swings back and forth around the second pivot shaft 17.

In place of the bucket 11, another working tool may be attached to the front portions of the booms 10. Examples of the other working tool include auxiliary attachments such as a hydraulic crusher, a hydraulic breaker, an angle broom, an earth auger, a pallet fork, a sweeper, a mower, and a snow blower.

A hydraulic extraction unit (not illustrated) is disposed in the front portion of the left boom 10. The hydraulic extraction unit connects a hydraulic actuator (not illustrated) of the auxiliary attachment and a pipe (not illustrated) such as a hydraulic pipe disposed in the left boom 10. The hydraulic extraction unit and the hydraulic actuator of the auxiliary attachment are connected by another hydraulic pipe. Hydraulic fluid supplied to the hydraulic extraction unit passes through the other hydraulic pipe and is supplied to the hydraulic actuator.

The at least one bucket cylinder 15 includes bucket cylinders 15, each of which is arranged near the front portion of a corresponding one of the booms 10. In response to extension or contraction of the bucket cylinders 15, the bucket 11 swings up or down.

The at least one traveling device 5 includes traveling devices 5 disposed in outer portions of the machine body 2. In this preferred embodiment, the traveling devices 5, which are disposed on the left and right sides of the machine body 2, are crawler (or semi-crawler) traveling devices. A wheeled traveling device having at least one front wheel and at least one rear wheel may be used in place of the traveling devices 5.

In response to extension or contraction of the boom cylinders 14, the booms 10 swing up or down. In response to extension or contraction of the bucket cylinders 15, the bucket 11 swings up or down.

First Preferred Embodiment

FIG. 1A is a diagram illustrating a hydraulic system 30A for a working system of the working machine 1 according to a first preferred embodiment.

As illustrated in FIG. 1A, the hydraulic system 30A includes a first hydraulic pump P1 and a second hydraulic pump P2. The first hydraulic pump P1 is a hydraulic pump to be driven by the power of the engine 32. The first hydraulic pump P1 is capable of delivering hydraulic fluid stored in a hydraulic fluid tank 22. The first hydraulic pump P1 includes a fixed-displacement gear pump having a delivery flow rate that varies in accordance with the rotational speed of the engine 32.

The second hydraulic pump P2 is a hydraulic pump to be driven by the power of the engine 32, and is installed at a position different from the first hydraulic pump P1. The second hydraulic pump P2 includes a swash-plate variable displacement axial pump. The second hydraulic pump P2 is capable of delivering the hydraulic fluid stored in the hydraulic fluid tank 22.

The second hydraulic pump P2 delivers hydraulic fluid to activate hydraulic actuators to perform work in the working machine 1. Examples of such hydraulic actuators include the boom cylinders 14, the bucket cylinders 15, a hydraulic actuator disposed in the auxiliary attachment, and a hydraulic actuator disposed in the traveling device 5. The first hydraulic pump P1 delivers pilot fluid to switch a control valve (such as at least one control valve 56 in FIG. 1A) to control activation of hydraulic devices (such as hydraulic valves and hydraulic actuators) of the working machine 1.

The hydraulic system 30A is a hydraulic system to activate the booms 10, the bucket 11, the auxiliary attachment, and the like, and includes a plurality of control valves 56. The plurality of control valves 56 are disposed in a fluid passage 39 connected to a delivery port of the second hydraulic pump P2. The plurality of control valves 56 include a boom control valve 56A, a bucket control valve 56B, and an auxiliary control valve 56C. The boom control valve 56A is a valve to control activation of the boom cylinders 14. The bucket control valve 56B is a valve to control activation of the bucket cylinders 15. The auxiliary control valve 56C is a valve to control activation of the hydraulic actuator disposed in the auxiliary attachment.

The booms 10 and the bucket 11 are operable with an operation member 58 such as a lever operation member disposed around the operator's seat 8. The operation member 58 is included in an operation device (work operation device) 52. The operation member 58 is supported so as to be tiltable to the front, rear, left, and right from a neutral position and tiltable diagonally forward to the left, diagonally rearward to the left, diagonally forward to the right, and diagonally rearward to the right from the neutral position. In response to the operation member 58 being tilted in any direction, any one of a plurality of operation valves 59 (a lowering operation valve 59A, a raising operation valve 59B, a bucket-dumping operation valve 59C, and a bucket-shoveling operation valve 59D) disposed below the operation member 58 can be operated. The plurality of operation valves 59 are connected to a first pilot fluid passage 40 connected to the first hydraulic pump P1 and can be supplied with hydraulic fluid from the first hydraulic pump P1.

When the operation member 58 is tilted to the front, the lowering operation valve 59A is operated, and a pilot pressure is output from the lowering operation valve 59A. The pilot pressure acts on a pressure receiver of the boom control valve 56A to lower the booms 10.

When the operation member 58 is tilted to the rear, the raising operation valve 59B is operated, and a pilot pressure is output from the raising operation valve 59B. The pilot pressure acts on a pressure receiver of the boom control valve 56A to raise the booms 10.

When the operation member 58 is tilted to the right, the bucket-dumping operation valve 59C is operated, and the pilot pressure acts on a pressure receiver of the bucket control valve 56B. As a result, the bucket control valve 56B is activated in a direction to extend the bucket cylinders 15, and the bucket 11 performs a dumping operation at a speed proportional to the amount of tilt of the operation member 58.

When the operation member 58 is tilted to the left, the bucket-shoveling operation valve 59D is operated, and the pilot pressure acts on a pressure receiver of the bucket control valve 56B. As a result, the bucket control valve 56B is activated in a direction to contract the bucket cylinders 15, and the bucket 11 performs a shoveling operation at a speed proportional to the amount of tilt of the operation member 58.

The auxiliary attachment is operable with an operation switch 24 disposed around the operator's seat 8. The operation switch 24 includes, for example, a swingable seesaw switch, a slidable slide switch, or a depressible push switch. An electric signal corresponding to the operation of the operation switch 24 is input to a controller 25 (which may be referred to as "an electric controller" herein).

The controller 25 includes a semiconductor device such as a central processing unit (CPU), a microprocessor unit (MPU), or a memory, and electric and electronic circuits, for example. The controller 25 outputs a command (electric signal) corresponding to the amount of operation of the operation switch 24 to a first solenoid valve 60A and a second solenoid valve 60B. The first solenoid valve 60A and the second solenoid valve 60B are opened in accordance with a command output from the controller 25, that is, in accordance with the amount of operation of the operation switch 24. As a result, the pilot fluid is supplied to the auxiliary control valve 56C connected to the first solenoid valve 60A and the second solenoid valve 60B, and the auxiliary actuator of the auxiliary attachment is activated by the hydraulic fluid supplied from the auxiliary control valve 56C.

The hydraulic system 30A includes a load sensing system that controls the delivery amount of the hydraulic fluid from the second hydraulic pump P2 in accordance with the work performed with the working machine 1. The load sensing system includes a first fluid passage 70, a second fluid passage 71, a hydraulic control unit 75 (which may be referred to as "a hydraulic controller" herein), a solenoid valve 81, and a pressure compensation unit 90 (which may be referred to as "a pressure compensator" herein). The hydraulic control unit 75 includes a flow rate compensation valve 72, a swash plate changing unit 73, and an opening changing unit 76 which may be referred to as "an opening adjuster" herein). The pressure compensation unit 90 will be described below.

The first fluid passage 70 (also referred to as "PLS fluid passage") is connected to the control valves 56 (the boom control valve 56A, the bucket control valve 56B, and the auxiliary control valve 56C) and the flow rate compensation valve 72. The first fluid passage 70 is a fluid passage to detect load pressures, which are pressures of the hydraulic fluid applied to the control valves 56 (the boom control valve 56A, the bucket control valve 56B, and the auxiliary control valve 56C), when the control valves 56 (the boom control valve 56A, the bucket control valve 56B, and the auxiliary control valve 56C) are in operation. The first fluid passage 70 transmits a PLS signal pressure, which is the highest load pressure among the load pressures of the control valves 56, namely, the boom control valve 56A, the bucket control valve 56B, and the auxiliary control valve 56C, to the flow rate compensation valve 72. That is, the highest load pressure when the hydraulic actuators, such as the boom cylinders 14 and the bucket cylinders 15, are in operation can act on the first fluid passage 70.

The second fluid passage 71 (also referred to as "PPS fluid passage") is connected to the delivery port of the second hydraulic pump P2 and the flow rate compensation valve 72. The second fluid passage 71 transmits a PPS signal pressure, which is the pressure (delivery pressure) of the hydraulic fluid delivered from the second hydraulic pump P2, to the flow rate compensation valve 72. That is, the delivery pressure of the hydraulic fluid from the second hydraulic pump P2 can act on the second fluid passage 71. The second hydraulic pump P2 delivers the hydraulic fluid to the second fluid passage 71 and the fluid passage 39 in accordance with the state of the opening of the spools of the control valves 56 (the boom control valve 56A, the bucket control valve 56B, and the auxiliary control valve 56C).

Figure 1B:
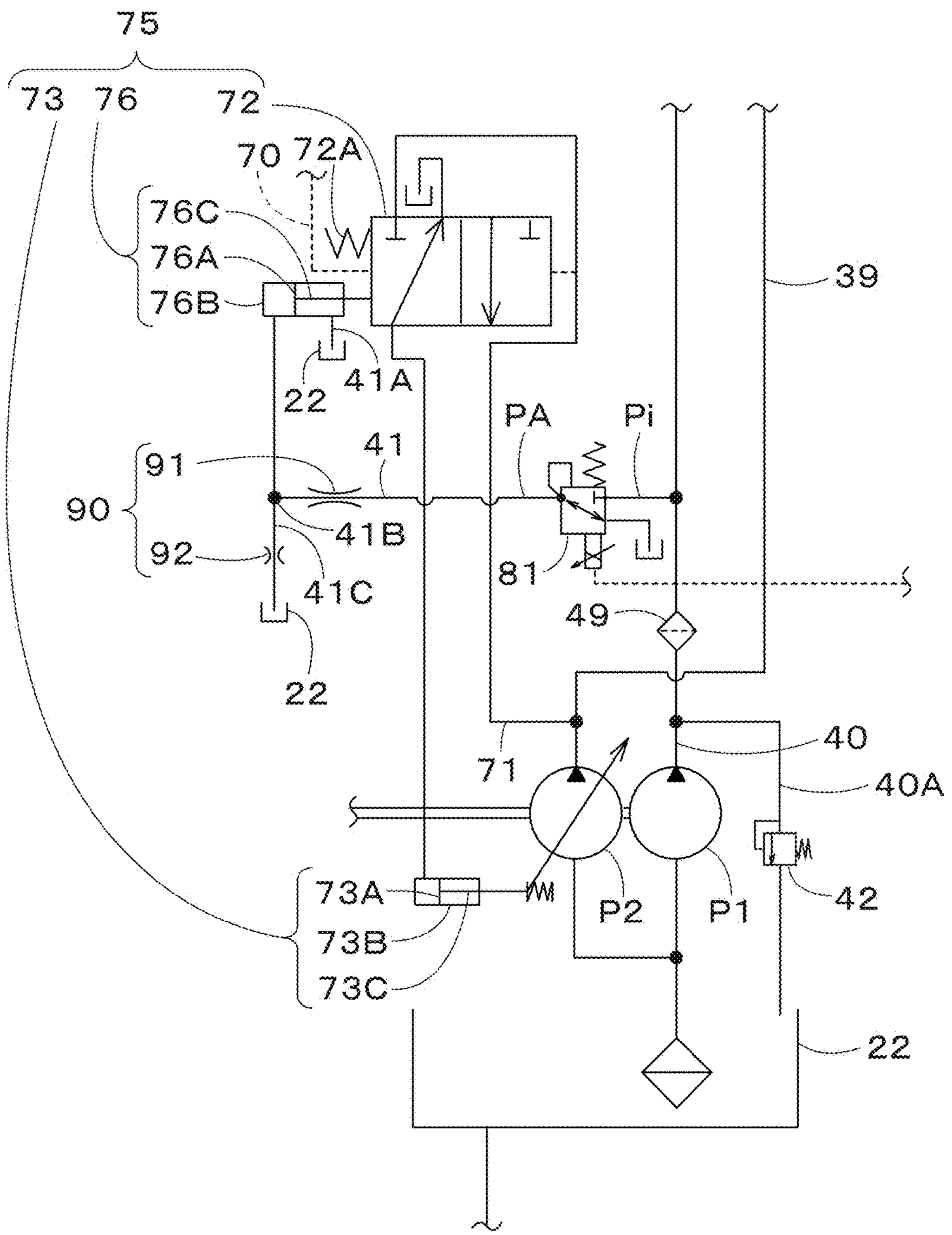
FIG. 1B is an enlarged view of a hydraulic control unit and its peripheral portion according to the first preferred embodiment of the present invention.

FIG. 1B is an enlarged view of the hydraulic control unit 75 and its peripheral portion in the hydraulic system 30A.

The swash plate changing unit 73 is, for example, a hydraulic cylinder. The swash plate changing unit 73 includes a piston 73A, a housing 73B that houses the piston 73A, and a rod (movable unit) 73C coupled to the piston 73A. One end of the rod 73C is connected to the piston 73A. The other end of the rod 73C is connected to a swash plate of the second hydraulic pump P2. In response to supply of the hydraulic fluid from the flow rate compensation valve 72 into the housing 73B of the swash plate changing unit 73 from a bottom of the housing 73B, the piston 73A moves to extend or contract the rod 73C, and the angle of the swash plate of the second hydraulic pump P2 can be changed. That is, the swash plate changing unit 73 changes the angle of the swash plate of the second hydraulic pump P2. The hydraulic fluid supplied into the housing 73B is discharged to the hydraulic fluid tank 22 from, for example, a fluid passage (not illustrated) connected to a top of the housing 73B (i.e., a portion of the housing 73B closer to the rod 73C than to the piston 73A).

The flow rate compensation valve 72 is a control valve and is connected to the first fluid passage 70 and the second fluid passage 71. The flow rate compensation valve 72 is a control valve capable of controlling activation of the swash plate changing unit 73 on the basis of the PLS signal pressure and the PPS signal pressure. The flow rate compensation valve 72 has a supply port from which the hydraulic fluid is to be supplied to the swash plate changing unit 73, and the opening of the supply port is set so that an LS differential pressure, which is a pressure difference between the PPS signal pressure and the PLS signal pressure (given by PPS signal pressure—PLS signal pressure), is kept constant. The flow rate compensation valve 72 supplies the hydraulic fluid to the swash plate changing unit 73 in accordance with the set opening to apply a hydraulic pressure to the swash plate changing unit 73 to move the piston 73A of the swash plate changing unit 73 to extend or contract the rod 73C.

In the load sensing system having the configuration described above, the angle of the swash plate of the second hydraulic pump P2 is changed by the flow rate compensation valve 72, the swash plate changing unit 73, and the like so that the LS differential pressure, which is the pressure difference between the PPS signal pressure and the PLS signal pressure, is kept constant, and the delivery amount of the hydraulic fluid from the second hydraulic pump P2 is adjusted.

The hydraulic system 30A includes a horsepower control circuit. The horsepower control circuit includes the hydraulic control unit 75. The hydraulic control unit 75 is also activated by the pilot fluid delivered from the first hydraulic pump P1, and controls the second hydraulic pump P2 to keep the LS differential pressure constant.

The pilot fluid delivered from the first hydraulic pump P1 flows through the first pilot fluid passage 40. A second pilot fluid passage 41 branches off from the first pilot fluid passage 40 and is connected to the hydraulic control unit 75. The second pilot fluid passage 41 is provided with the solenoid valve 81. The solenoid valve 81 changes the pilot pressure, which is the pressure of the pilot fluid that acts on the hydraulic control unit 75. The solenoid valve 81 includes a solenoid proportional valve, a pilot check valve, or a variable relief valve, for example. In the example illustrated in FIGS. 1A and 1B, the solenoid valve 81 is a solenoid proportional valve. The opening of the solenoid valve 81 is changeable as appropriate in response to energization of a solenoid or the like of the solenoid valve 81. The activation (change in the opening) of the solenoid valve 81 is electrically controlled by the controller 25.

The first pilot fluid passage 40 is provided with a filter 49 at an intermediate portion upstream of the second pilot fluid passage 41 (adjacent to the first hydraulic pump P1). A fluid passage 40A branches off from the first pilot fluid passage 40 at a portion upstream of the filter 49 and reaches the hydraulic fluid tank 22. The fluid passage 40A is provided with a relief valve 42.

The pilot fluid delivered from the first hydraulic pump P1 to the first pilot fluid passage 40 flows to the opening changing unit 76 through the filter 49, the second pilot fluid passage 41, and the solenoid valve 81. In response to a change in the opening of the solenoid valve 81, the solenoid valve 81 changes the flow rate of the pilot fluid reaching the opening changing unit 76 through the second pilot fluid passage 41 to adjust the pilot pressure to be applied to the opening changing unit 76. More specifically, as the opening of the solenoid valve 81 decreases, the flow rate of the pilot fluid flowing to the opening changing unit 76 decreases, and the pilot pressure acting on the opening changing unit 76 increases. The filter 49 also increases the pilot pressure acting on the opening changing unit 76 from the first pilot fluid passage 40 and the second pilot fluid passage 41.

As described above, the solenoid valve 81 adjusts the pilot pressure of the pilot fluid to activate the opening changing unit 76. Further, in response to a change in the opening of the solenoid valve 81, a pilot differential pressure (pressure difference in pilot fluid, which is given by PA−Pi) is generated, in the pilot fluid flowing through the second pilot fluid passage 41, between a first pressure Pi of the pilot fluid flowing into the solenoid valve 81 and a second pressure PA of the pilot fluid flowing out of the solenoid valve 81. In addition, the pilot differential pressure changes. That is, the second pressure PA is a pressure of the pilot fluid flowing out of the solenoid valve 81 and flowing into a first throttle 91 described below (i.e., a pressure over a section between the solenoid valve 81 and the first throttle 91).

The opening changing unit 76 is, for example, a hydraulic cylinder. The opening changing unit 76 includes a piston 76A, a housing 76B that houses the piston 76A, and a rod 76C coupled to the piston 76A. One end of the rod 76C is connected to the piston 76A. The other end of the rod 76C is connected to the flow rate compensation valve 72. The second pilot fluid passage 41 is connected to a bottom of the housing 76B (the side of the housing 76B farther away from the rod 76C).

In response to the pilot pressure (the second pressure PA) of the pilot fluid flowing into the housing 76B from the second pilot fluid passage 41 through the bottom of the housing 76B (the side of the housing 76B farther away from the rod 76C), the piston 76A moves in the housing 76B. More specifically, when the pilot pressure of the pilot fluid flowing into the housing 76B from the second pilot fluid passage 41 decreases, the piston 76A moves in a direction to contract the rod 76C (i.e., a direction away from the flow rate compensation valve 72). When the pilot pressure of the pilot fluid flowing into the housing 76B from the second pilot fluid passage 41 increases, the piston 76A moves in a direction to extend the rod 76C (i.e., a direction approaching the flow rate compensation valve 72). In response to extension or contraction of the rod 76C, the opening of the flow rate compensation valve 72 is changed. That is, the opening changing unit 76 is activated in accordance with the pilot pressure adjusted by the solenoid valve 81 to change the opening of the flow rate compensation valve 72. The pilot fluid in the housing 76B of the opening changing unit 76 is discharged from a discharge fluid passage 41A connected to the side of the housing 76B closer to the rod 76C.

The opening of the flow rate compensation valve 72 is set so that the LS differential pressure, which is the differential pressure between the PLS signal pressure and the PPS signal pressure, is kept constant. In addition, the opening of the flow rate compensation valve 72 is changed in accordance with the movement of the piston 76A of the opening changing unit 76. In response to the change in the opening of the flow rate compensation valve 72, the flow rate and pressure of the hydraulic fluid to be supplied from the flow rate compensation valve 72 to the swash plate changing unit 73 are also changed.

When the opening changing unit 76 is not in operation, a spool (not illustrated) included in the flow rate compensation valve (control valve) 72 is biased in a predetermined direction by a spring 72A to set the opening of the flow rate compensation valve 72 so that the LS differential pressure is kept constant. When the opening changing unit 76 is activated and the rod 76C extends or contracts, the spool of the flow rate compensation valve 72 moves against the elastic force of the spring 72A, and the opening of the flow rate compensation valve 72 is changed. Accordingly, the flow rate and pressure of the hydraulic fluid to be supplied from the flow rate compensation valve 72 to the swash plate changing unit 73 are changed. In response to the change in flow rate and pressure, the piston 73A of the swash plate changing unit 73 moves to extend or contract the rod 73C. As a result, the angle of the swash plate of the second hydraulic pump P2 is changed.

The controller 25 illustrated in FIG. 1A controls activation of the solenoid valve 81 to also control the hydraulic control unit 75 and the second hydraulic pump P2, and changes the LS differential pressure to be kept constant by the flow rate compensation valve 72. The change of the LS differential pressure will be described in detail hereinafter.

The controller 25 is connected to a first measurement device 82 that measures the rotational speed of the engine 32. In the following, the rotational speed of the engine 32 is simply referred to as "engine rotational speed", and the value measured by the first measurement device 82 is referred to as "actual rotational speed". The controller 25 outputs a control signal (current signal) to the solenoid valve 81 in accordance with the engine rotational speed (actual rotational speed) measured by the first measurement device 82, and controls the opening of the solenoid valve 81. The pilot pressure (the second pressure PA) acting on the opening changing unit 76 is changed in accordance with the opening of the solenoid valve 81, and the opening changing unit 76 changes the opening of the flow rate compensation valve 72. In response to the change in the opening of the flow rate compensation valve 72, the pressure of the hydraulic fluid acting on the swash plate changing unit 73 from the flow rate compensation valve 72 is changed, the angle of the swash plate of the second hydraulic pump P2 is changed by the swash plate changing unit 73, and the flow rate of the hydraulic fluid to be delivered from the second hydraulic pump P2 is changed. Accordingly, the LS differential pressure, which is the differential pressure (pressure difference) between the PLS signal pressure acting on the first fluid passage 70 and the PPS signal pressure acting on the second fluid passage 71, is changed. The changed LS differential pressure is kept constant by the flow rate compensation valve 72 or the like.

Figure 2A:
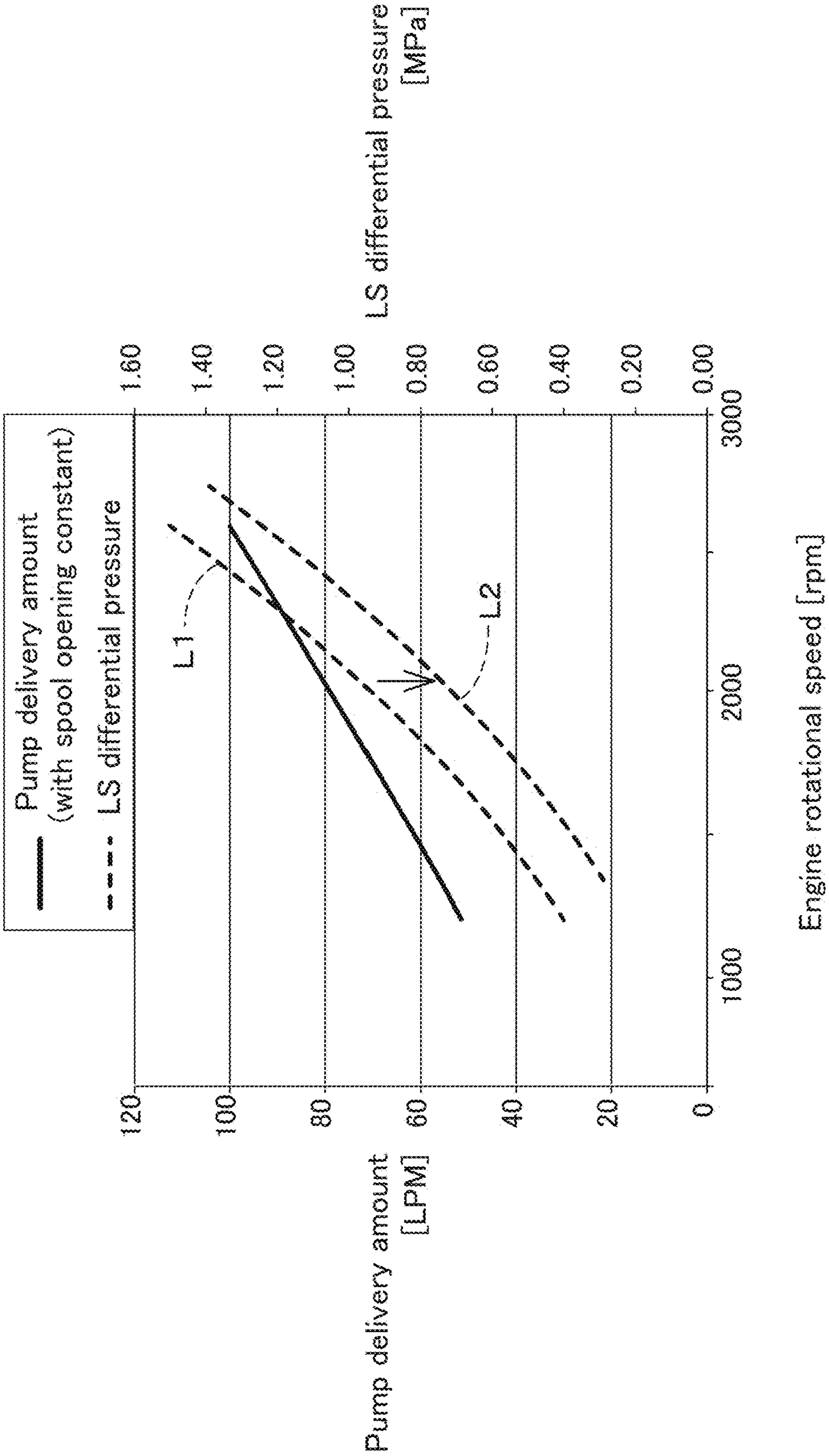
FIG. 2A is a graph illustrating a relationship among an engine rotational speed, an LS differential pressure, and a pump delivery amount according to the first preferred embodiment of the present invention.

FIG. 2A is a graph illustrating a relationship among the engine rotational speed, the LS differential pressure, and a pump delivery amount in the working machine 1. FIG. 2B is a table illustrating the same relationship as that illustrated in FIG. 2A. In FIGS. 2A and 2B, the pump delivery amount is the delivery amount of the hydraulic fluid from the second hydraulic pump P2 when the spools of the control valves 56 (the boom control valve 56A, the bucket control valve 56B, and the auxiliary control valve 56C) have a constant (maximum) opening area.

The relationship among the engine rotational speed, the LS differential pressure, and the pump delivery amount illustrated in FIGS. 2A and 2B is derived based on results of experiments or simulations performed in advance, for example. Data indicating the relationship is stored in a storage unit 26 included in the controller 25. The data indicating the relationship may be, for example, data of a graph as illustrated in FIG. 2A, data of a table as illustrated in FIG. 2B, or data of a function for calculating the LS differential pressure from the actual rotational speed of the engine 32. That is, the relationship among the engine rotational speed, the LS differential pressure, and the pump delivery amount may be data of any form that allows the corresponding LS differential pressure to be determined from the actual rotational speed of the engine 32. The relationship among the engine rotational speed, the LS differential pressure, and the pump delivery amount illustrated in FIGS. 2A and 2B is hereinafter referred to as a control map, for convenience of description.

In FIG. 2A, a control line L1 indicated by a broken line represents a change in the LS differential pressure relative to the engine rotational speed. The control line L1 corresponds to the relationship between the engine rotational speed and the LS differential pressure illustrated in FIG. 2B in a one-to-one manner. A thick solid line illustrated in FIG. 2A represents a change in the pump delivery amount relative to the engine rotational speed, and corresponds to the relationship between the engine rotational speed and the pump delivery amount illustrated in FIG. 2B in a one-to-one manner.

The first control line L1 in the control map illustrated in FIG. 2A or the first and second columns from the left of the control map illustrated in FIG. 2B represent the change in the LS differential pressure when the engine rotational speed changes from a rotational speed (1200 rpm) during idling to a maximum rotational speed (2600 rpm). The term "idling" refers to a state in which the engine rotational speed is kept low in the working machine 1. The first control line L1 illustrated in FIGS. 2A and 2B indicate that as the engine rotational speed increases, the LS differential pressure also increases.

Upon acquiring the actual rotational speed of the engine 32, which is measured by the first measurement device 82, from the first measurement device 82, the controller 25 sets the LS differential pressure corresponding to the acquired actual rotational speed on the basis of the control map illustrated in FIG. 2A or 2B. Then, the controller 25 outputs a control signal corresponding to the set LS differential pressure to the solenoid valve 81 to change the opening of the solenoid valve 81. The control signal corresponding to the LS differential pressure set by the controller 25 may be generated by the controller 25 in accordance with an arithmetic expression or control data stored in advance in the storage unit 26. In response to a change in the opening of the solenoid valve 81 in accordance with the control signal from the controller 25 in the way described above, the pilot pressure (the second pressure PA) acting on the opening changing unit 76 is changed. The second hydraulic pump P2 is controlled by the opening changing unit 76, the flow rate compensation valve 72, and the swash plate changing unit 73 to realize the LS differential pressure corresponding to the control signal. That is, the controller 25 causes the hydraulic control unit 75 to change the LS differential pressure in accordance with the actual rotational speed of the engine 32, which is measured by the first measurement device 82.

In response to a change in the LS differential pressure in the way described above, the angle of the swash plate of the second hydraulic pump P2 is changed, and the delivery amount of the hydraulic fluid from the second hydraulic pump P2 is adjusted. That is, the output of the second hydraulic pump P2 is adjusted in conjunction with the driving of the engine 32 of the working machine 1. Accordingly, the accuracy of horsepower control of the working system of the working machine 1 can be improved, and a maximum output of the second hydraulic pump P2 can be obtained in the controllable horsepower range.

Further, the controller 25 controls the opening of the solenoid valve 81 to change the pilot pressure (the second pressure PA) acting on the opening changing unit 76, and the LS differential pressure is changed by the opening changing unit 76, the flow rate compensation valve 72, and the swash plate changing unit 73. As a result, the output of the second hydraulic pump P2 is adjusted. Accordingly, the output of the second hydraulic pump P2 can be flexibly adjusted, and the accuracy of the horsepower control of the working system of the working machine 1 can further be improved.

Now, the pressure compensation unit 90 will be described. The pressure compensation unit 90 is located between the solenoid valve 81 and the hydraulic control unit 75. The pressure compensation unit 90 increases the pilot pressure as the temperature of the pilot fluid decreases. Specifically, the pressure compensation unit 90 includes a discharge fluid passage 41C, the first throttle 91, and a second throttle 92. The discharge fluid passage 41C branches off from the second pilot fluid passage 41 at a branch point 41B between the solenoid valve 81 and the hydraulic control unit 75, and discharges a portion of the pilot fluid to the hydraulic fluid tank 22. The first throttle 91 is, for example, a throttle and is located in the second pilot fluid passage 41 between the solenoid valve 81 and the branch point 41B. The second throttle 92 is a throttle having a different flow rate characteristic from the first throttle 91, and is located in the discharge fluid passage 41C. The pressure compensation unit 90 increases the differential pressure between the second pressure PA and a third pressure of the pilot fluid output from the first throttle 91 as the temperature of the pilot fluid decreases.

The first throttle 91 and the second throttle 92 are different in at least one of throttle hole diameter or throttle length. Accordingly, the ease of flow of the pilot fluid though the first throttle 91 and the ease of flow of the pilot fluid though the second throttle 92 differ with the decrease in the temperature of the pilot fluid. That is, the flow path resistances of the first throttle 91 and the second throttle 92 increase as the temperature of the pilot fluid decreases, with the amounts of increase of the flow path resistances being different. In other words, the first throttle 91 and the second throttle 92 have different viscosity sensitivities. In this preferred embodiment, in an example, the first throttle 91 is a choke throttle, and the second throttle 92 is an orifice throttle.

The choke throttle (the first throttle 91) is likely to be affected by the viscosity of the hydraulic fluid. By contrast, the orifice throttle (the second throttle 92) is unlikely to be affected by the viscosity of the hydraulic fluid (pilot fluid). Thus, the pressure loss caused by the first throttle 91 is larger than that by the second throttle 92 at low temperatures, and is smaller than that by the second throttle 92 at high temperatures. Accordingly, even when the solenoid valve 81 (proportional valve) outputs a constant pressure, the pressure to be applied to the piston 76A (i.e., a gain control piston) of the opening changing unit 76 varies between low and high temperatures, as described below.

Here, a description will be given of a case where the hydraulic fluid is at a low temperature and a case where the hydraulic fluid is at a high temperature. It is assumed that control signals having the same value are to be output to the solenoid valve 81 (proportional valve) when the hydraulic fluid is at a low temperature and when the hydraulic fluid is at a high temperature.

When the hydraulic fluid (pilot fluid) is at a low temperature, the pressure loss caused by the choke throttle (the first throttle 91) increases (the pressure loss with respect to the flow rate increases), and the flow rate of the hydraulic fluid flowing to the piston 76A (i.e., the gain control piston) of the opening changing unit 76 decreases compared to when the hydraulic fluid is at a high temperature. In the low-temperature period, thus, the pressure to be applied to the piston 76A (i.e., the gain control piston) of the opening changing unit 76 is smaller than in the high-temperature period. Then, the piston 76A moves in the direction to contract the rod 76C (i.e., in a direction away from the flow rate compensation valve 72), and the opening of the flow rate compensation valve 72 is changed. Then, the piston 73A of the swash plate changing unit 73 moves, the rod 73C contracts, the angle of the swash plate of the second hydraulic pump P2 increases, and the delivery amount of the hydraulic fluid from the second hydraulic pump P2 increases compared to the high-temperature period. As a result, in the low-temperature period, the LS differential pressure is larger than in the high-temperature period.

When the hydraulic fluid (pilot fluid) is at a high temperature, the pressure loss caused by the choke throttle (the first throttle 91) decreases (the pressure loss with respect to the flow rate decreases), and the flow rate of the hydraulic fluid flowing from the solenoid valve 81 (proportional valve) to the piston 76A (i.e., the gain control piston) of the opening changing unit 76 increases compared to when the hydraulic fluid is at a low temperature. In the high-temperature period, thus, the pressure to be applied to the piston 76A (i.e., the gain control piston) of the opening changing unit 76 is larger than in the low-temperature period. Accordingly, the pressure to be applied to the piston 76A (i.e., the gain control piston) of the opening changing unit 76 increases compared to the low-temperature period. That is, the pilot pressure of the pilot fluid flowing into the housing 76B from the second pilot fluid passage 41 is larger than in the high-temperature period, and the piston 76A moves in the direction to extend the rod 76C (i.e., the direction approaching the flow rate compensation valve 72). As a result, the opening of the flow rate compensation valve 72 is changed. Then, the piston 73A of the swash plate changing unit 73 moves, the rod 73C extends, the angle of the swash plate of the second hydraulic pump P2 decreases, and the delivery amount of the hydraulic fluid from the second hydraulic pump P2 decreases compared to the low-temperature period. As a result, in the high-temperature period, the LS differential pressure is smaller than in the low-temperature period.

This configuration allows the pressure compensation unit 90 to decrease the pilot pressure as the temperature of the hydraulic fluid (pilot fluid or hydraulic fluid) including the pilot fluid decreases. Accordingly, in the configuration for performing horsepower control by using the solenoid valve 81 (proportional valve), it is possible to perform temperature correction of pilot pressure with a simple configuration. That is, the configuration to perform horsepower control by using the solenoid valve 81 (proportional valve) can increase the delivery amount of the hydraulic fluid from the second hydraulic pump P2 in the low-temperature period, and can decrease the delivery amount of the hydraulic fluid from the second hydraulic pump P2 in the high-temperature period. Therefore, the LS differential pressure in the low-temperature period can be larger than that in a room-temperature period. Further, pressure correction control is achieved without increasing the complexity of the configuration of the hydraulic system. For example, no need exists to provide a temperature detector for detecting the temperature of the pilot fluid and a device to perform pressure correction control on the solenoid valve 81 in accordance with the temperature of the pilot fluid on the basis of the temperature detected by the temperature detector. That is, no need exists to perform pressure correction control on the solenoid valve 81 in accordance with the temperature of the pilot fluid. The first preferred embodiment provides a configuration to decrease the LS differential pressure as the pressure of the solenoid valve 81 (proportional valve) increases (i.e., as the pressure to be applied to the housing 76B of the opening changing unit 76 increases). In a fail-safe viewpoint, the configuration prevents the actuators from stopping their operation if the solenoid valve 81 is damaged and no pressure can be output from the solenoid valve 81.

In addition, the temperature correction of the pilot pressure can be performed with additional simple hydraulic components such as the discharge fluid passage 41C, the first throttle 91, and the second throttle 92.

The first throttle 91 and the second throttle 92 are different in at least one of throttle hole diameter or throttle length. Accordingly, the first throttle 91 and the second throttle 92 can have different flow rate characteristics (in other words, different viscosity sensitivities). As a result, the temperature correction of the pilot pressure can be performed with additional simple hydraulic components such as the discharge fluid passage 41C, the first throttle 91, and the second throttle 92.

In addition, the choke throttle (the first throttle 91) and the orifice throttle (the second throttle 92) having different flow rate characteristics (viscosity sensitivities) are arranged as desired to more suitably perform the temperature correction of the pilot pressure.

In FIGS. 1A and 1B, in an example, the first throttle 91 is a choke throttle and the second throttle 92 is an orifice throttle. However, the present invention is not limited to this example.

Figure 1C:
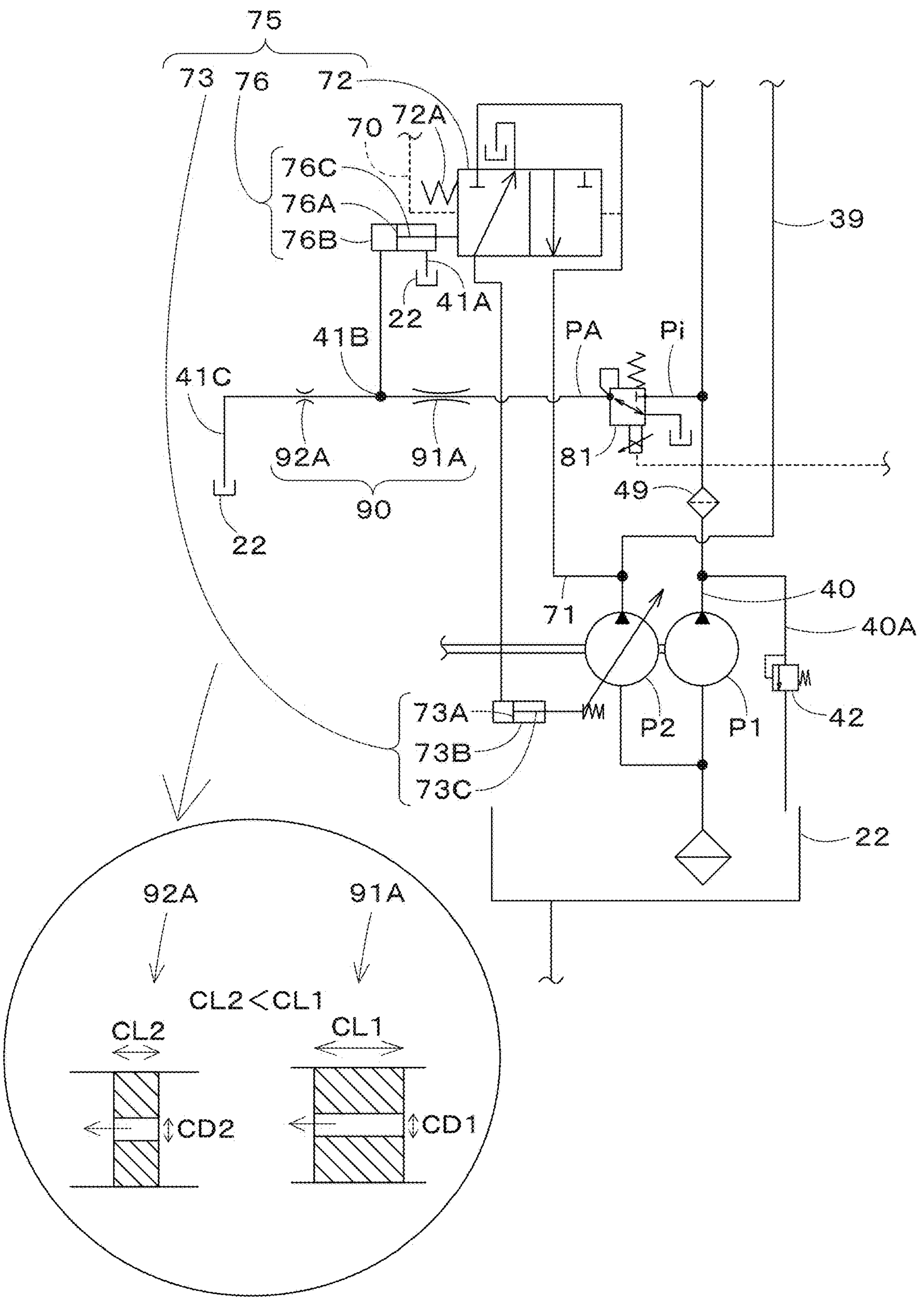
FIG. 1C is an enlarged view of a hydraulic control unit and its peripheral portion according to a modification of the first preferred embodiment of the present invention.

In another example, as illustrated in FIG. 1C, both a first throttle 91A and a second throttle 92A are choke throttles, and the first throttle 91A has a choke length CL1 serving as a throttle length that is larger than a choke length CL2 of the second throttle 92A. Accordingly, the first throttle 91A is more likely to be affected by the viscosity of the hydraulic fluid than the second throttle 92A. In other words, the second throttle 92A is less likely to be affected by the viscosity of the hydraulic fluid than the first throttle 91A. The first throttle 91A has a choke inside diameter CD1 serving as a throttle hole diameter. The choke inside diameter CD1 of the first throttle 91A may be smaller than a choke inside diameter CD2 of the second throttle 92A. Alternatively, the choke length CL1 of the first throttle 91A may be longer than the choke length CL2 of the second throttle 92A, and the choke inside diameter CD1 of the first throttle 91A may be smaller than the choke inside diameter CD2 of the second throttle 92A. As described above, the choke throttles (i.e., the first throttle 91A and the second throttle 92A) having different flow rate characteristics (viscosity sensitivities) can be used to suitably perform the temperature correction of the pilot pressure.

Figure 1D:
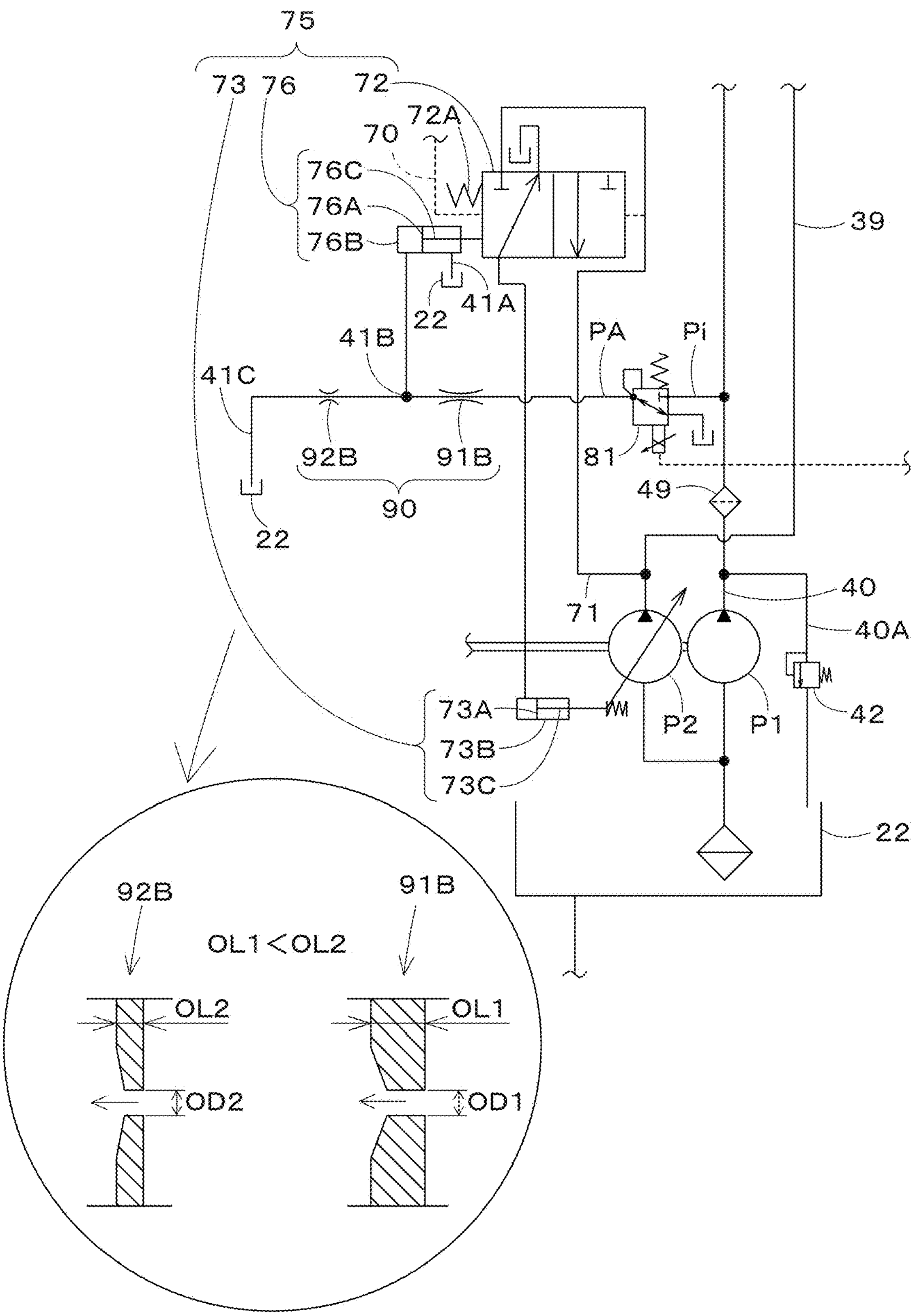
FIG. 1D is an enlarged view of a hydraulic control unit and its peripheral portion according to a modification of the first preferred embodiment of the present invention.

In another example, as illustrated in FIG. 1D, both a first throttle 91B and a second throttle 92B are orifice throttles, and the first throttle 91B has an orifice blade length OL1 serving as a throttle length that is longer than an orifice blade length OL2 of the second throttle 92B. In this case, the throttle length is the length of a portion with a narrowed diameter. Accordingly, the first throttle 91B is more likely to be affected by the viscosity of the hydraulic fluid than the second throttle 92B. In other words, the second throttle 92B is less likely to be affected by the viscosity of the hydraulic fluid than the first throttle 91B. The first throttle 91B has an orifice diameter OD1 serving as a throttle hole diameter. The orifice diameter OD1 of the first throttle 91B may be smaller than an orifice diameter OD2 of the second throttle 92B. Alternatively, the first throttle 91B may have an orifice blade length OL1 that is longer than an orifice blade length OL2 of the second throttle 92B, and the orifice diameter OD1 of the first throttle 91B may be smaller than the orifice diameter OD2 of the second throttle 92B. As described above, the orifice throttles (i.e., the first throttle 91B and the second throttle 92B) having different flow rate characteristics (viscosity sensitivities) can be used to suitably perform the temperature correction of the pilot pressure.

In FIGS. 2A and 2B, in an example, the controller 25 changes the LS differential pressure on the basis of the actual rotational speed of the engine 32. However, the present invention is not limited to this example. In another example, the controller 25 may change the LS differential pressure on the basis of the actual rotational speed of the engine 32 and a target engine rotational speed (target rotational speed). The target engine rotational speed can be set as a set value by an operation of an accelerator member 84 (FIG. 1A).

The accelerator member 84 includes a first accelerator member 84*a* and a second accelerator member 84*b*. In an example, the accelerator member 84 is also used as an instruction member. The first accelerator member 84*a* and the second accelerator member 84*b* are disposed near the operator's seat 8 and are connected to the controller 25. The first accelerator member 84*a* is a dial operation member having a rotatable knob. The target engine rotational speed can be set by the operator rotating the knob of the first accelerator member 84*a* while holding it. The second accelerator member 84*b* is a pedal operation member having a swingable pedal. The target engine rotational speed can also be set by the operator depressing the pedal of the second accelerator member 84*b*.

The amounts of operation of the first accelerator member 84*a* and the second accelerator member 84*b* are detected by, for example, a potentiometer or any other device and are input to the controller 25. The controller 25 adopts the larger one of a target engine rotational speed set by the first accelerator member 84*a* (referred to as "first target engine rotational speed") and a target engine rotational speed set by the second accelerator member 84*b* (referred to as "second target engine rotational speed"). For example, when the first target engine rotational speed is 1300 rpm and the second target engine rotational speed is 2200 rpm, the controller 25 sets the second target engine rotational speed set by the second accelerator member 84*b* as a target engine rotational speed EP2, and controls the driving of the engine 32 in accordance with the target engine rotational speed EP2.

If an actual rotational speed EP1 of the engine 32, which is measured by the first measurement device 82, is equal to or greater than the target engine rotational speed EP2 (actual rotational speed EP1≥target engine rotational speed EP2), the controller 25 sets the LS differential pressure on the basis of the first control line L1 in FIG. 2A and the actual rotational speed EP1, and outputs a control signal corresponding to the set LS differential pressure to the solenoid valve 81. That is, when the actual rotational speed EP1 of the engine 32 is equal to or greater than the target engine rotational speed EP2, the controller 25 changes the LS differential pressure in accordance with the actual rotational speed EP1 of the engine 32.

On the other hand, if the actual rotational speed EP1 of the engine 32, which is measured by the first measurement device 82, is lower than the target engine rotational speed EP2 (actual rotational speed EP1<target engine rotational speed EP2) or if the actual rotational speed EP1 is lower than a rotational speed obtained by subtracting a predetermined value A1 from the target engine rotational speed EP2 (actual rotational speed EP1<target engine rotational speed EP2−predetermined value A1, where A1=100 rpm, for example), as illustrated in FIG. 2A, the controller 25 calculates a second control line L2, which is shifted from the first control line L1 in a direction in which the LS differential pressure decreases. Then, the controller 25 sets the LS differential pressure on the basis of the second control line L2 and the actual rotational speed EP1, and outputs a control signal corresponding to the set LS differential pressure to the solenoid valve 81. That is, when the actual rotational speed EP1 of the engine 32 becomes lower than the target engine rotational speed EP2, the controller 25 decreases the LS differential pressure. The pump delivery amount indicated by the thick solid line in FIG. 2A corresponds to the first control line L1, but does not correspond to the second control line L2.

The controller 25 calculates the second control line L2 in accordance with, for example, Equation (1) below.

$$\text{Second control line } L2=\text{first control line } L1\times e^{2}[\text{constant}\times\text{maximum load factor (load factor}-\text{constant},0)] \quad (1)$$

In Equation (1), the load factor is a load factor of the engine 32, and the maximum load factor is a maximum load factor of the engine 32. The load factor of the engine 32 is the ratio of the output of the engine 32 when a device (the working device 4 or the traveling device 5) mounted on the working machine 1 is in operation (a load application state) to the output of the engine 32 when the device is not in operation (a no-load state). The output of the engine 32 is the amount of work (expressed in kW or PS (i.e., horsepower)) obtained by multiplying the torque of the engine 32 by the rotational speed of the engine 32. The torque of the engine 32 is detected by a torque sensor (not illustrated). When the value obtained by "load factor−constant" in Equation (1) is negative, the value of the "maximum load factor (given by load factor−constant)" is set to 0.

For example, when the hydraulic actuators (the boom cylinders 14, the bucket cylinders 15, and the hydraulic actuator of the auxiliary attachment) of the working device 4 are in stop state and the traveling device 5 is in stop state, the controller 25 determines that the engine 32 is in the no-load state. Then, the controller 25 calculates the output of the engine 32 at this time, and records the calculated value as the output of the engine 32 in the no-load state. The calculation of the output of the engine 32 in the no-load state and the recording of the calculated output may be executed by the controller 25 at intervals of a predetermined period. In another example, the output of the engine 32 in the no-load state may be set in advance and stored in the storage unit 26.

When at least one of the traveling device 5 and the hydraulic actuators of the working device 4 is activated, the controller 25 determines that the engine 32 is in the load application state. Then, the controller 25 calculates the output of the engine 32 at intervals of a predetermined period, and uses a calculated value as the output of the engine 32 in the load application state. Each time the controller 25 calculates the output of the engine 32 in the load application state, the controller 25 calculates the ratio of the output of the engine 32 in the load application state to the already recorded output of the engine 32 in the no-load state as a load factor of the engine 32, and records the calculated load factor. Further, the controller 25 detects the maximum load factor among the recorded load factors of the engine 32.

In another example, the controller 25 may calculate the second control line L2 in accordance with Equation (2) below.

$$\text{Second control line } L2=\text{first control line } L1\times e^{2}-(\alpha\times\Delta E) \quad (2)$$

In Equation (2), ΔE is a rotational speed difference between the target engine rotational speed and the actual rotational speed (rotational speed difference ΔE=target engine rotational speed EP2−actual rotational speed EP1). Further, α is a coefficient that changes in accordance with whether the working machine 1 is in a travel-priority mode in which travel is prioritized or a work-priority mode in which work of the working machine 1 is prioritized. The coefficient α in the work-priority mode has a smaller value than the coefficient α in the travel-priority mode. The travel-priority mode and the work-priority mode can be switched by the operation of a switch or the like disposed around the operator's seat 8. In addition, a slight travel-priority mode in which travel is slightly prioritized over work and a slight work-priority mode in which work is slightly prioritized over travel may be provided between the travel-priority mode and the work-priority mode, and the coefficient α may be changed for each of these four modes.

In another example, when the actual rotational speed of the engine 32 slightly decreases (by less than several rotations, for example) from the target engine rotational speed, the controller 25 may calculate the second control line L2 in accordance with Equation (3) or (4) below without using Equation (2) above.

$$\text{Second control line } L2=\text{first control line } L1\times e^{2}-(\alpha\times\Delta E^{2}) \quad (3)$$

$$\text{Second control line } L2=\text{first control line } L1\times e^{2}-\{\alpha\times\text{maximum load factor}(\Delta E-\text{constant},0)\} \quad (4)$$

In the example described above, when the actual rotational speed of the engine 32 becomes lower than the target engine rotational speed, the controller 25 calculates the second control line L2 by shifting the first control line L1 in the direction in which the LS differential pressure decreases. Alternatively, the second control line L2 may be set in advance and stored in the storage unit 26.

As described above, when the actual rotational speed of the engine 32 becomes lower than the target engine rotational speed, the controller 25 changes the LS differential pressure on the basis of the second control line L2 and the actual rotational speed. Thus, even if the actual rotational speed decreases in response to the application of some load to the engine 32, the delivery amount of the hydraulic fluid from the second hydraulic pump P2 can be reduced in accordance with the load. Further, the controller 25 calculates the second control line L2 in accordance with the load or the rotational speed of the engine 32. Thus, the delivery amount of the hydraulic fluid from the second hydraulic pump P2 can be reduced in accordance with the load of the engine 32. As a result, the accuracy of horsepower control of the working system of the working machine 1 can be improved.

In another example, the controller 25 may change the LS differential pressure on the basis of the difference (the rotational speed difference ΔE) between the target engine rotational speed and the actual rotational speed. In this case, first, the controller 25 determines the rotational speed difference (ΔE) between the target engine rotational speed set by the accelerator member 84 and the actual rotational speed measured by the first measurement device 82. Then, the control the controller 25 shifts the first control line L1 in the direction in which the LS differential pressure decreases, in accordance with the rotational speed difference ΔE. At this time, the controller 25 increases the shift amount of the first control line L1 as the rotational speed difference ΔE increases. Further, the controller 25 multiplies a predetermined constant A (pressure expressed in MPa) by the rotational speed difference ΔE to determine the shift amount (shift amount=A×ΔE). Then, the controller 25 shifts the first control line L1 in the direction in which the LS differential pressure decreases by the obtained shift amount to calculate the second control line L2. Then, the controller 25 sets the LS differential pressure on the basis of the second control line L2 and the actual rotational speed of the engine 32, and outputs a control signal corresponding to the set LS differential pressure to the solenoid valve 81.

With the operation described above, even if the actual rotational speed decreases with respect to the target engine rotational speed due to the load of the engine 32, the delivery amount of the hydraulic fluid from the second hydraulic pump P2 can be reduced in accordance with the amount of decrease (the rotational speed difference ΔE). As a result, it is possible to accurately perform horsepower control of the working system of the working machine 1 in accordance with the load of the engine 32.

In another example, a second control line L2 corresponding to each shift amount may be set in advance and stored in the storage unit 26.

Further, the controller 25 may change the LS differential pressure on the basis of the amount of fuel injected into the engine 32. In this case, the controller 25 calculates the injection amount of fuel to be injected from an injector (not illustrated) when controlling the driving of the engine 32. The injection amount is calculated based on various conditions input to the controller 25, such as the target engine rotational speed, the actual rotational speed, or a crank angle. The specific calculation method is known in the art and will not be further discussed. When the engine 32 is a diesel engine, the injection amount of fuel is an injection amount (main injection amount) of fuel to generate an output of the engine 32, and is not a post injection amount to perform diesel particulate filter (DPF) regeneration (particulate combustion) or the like.

Upon calculating the injection amount of fuel, the controller 25 determines whether the injection amount is greater than a predetermined injection threshold. The injection threshold is set to a value larger than a standard injection amount determined in accordance with the engine rotational speed. If the calculated injection amount of fuel is greater than the injection threshold, the controller 25 calculate the second control line L2 by shifting the first control line L1 in the direction in which the LS differential pressure decreases. Then, the controller 25 sets the LS differential pressure on the basis of the second control line L2 and the actual rotational speed of the engine 32, and outputs a control signal corresponding to the set LS differential pressure to the solenoid valve 81. With this operation, even if the load of the engine 32 is large and the injection amount of fuel becomes greater than the injection threshold, the delivery amount of the hydraulic fluid from the second hydraulic pump P2 can be reduced. As a result, it is possible to accurately perform horsepower control of the working system of the working machine 1 in accordance with the load of the engine 32.

Further, the solenoid valve 81 may change the LS differential pressure on the basis of the load factor of the engine 32. In this case, the controller 25 calculates the load factor of the engine 32 in the way described above, and determines whether the load factor is greater than a predetermined threshold. If the load factor of the engine 32 is greater than the threshold, the controller 25 calculates the second control line L2 by shifting the first control line L1 in the direction in which the LS differential pressure decreases. Then, the controller 25 sets the LS differential pressure on the basis of the second control line L2 and the actual rotational speed of the engine 32, and outputs a control signal corresponding to the set LS differential pressure to the solenoid valve 81. With this operation, even if the load of the engine 32 is large and the load factor becomes large, the delivery amount of the hydraulic fluid from the second hydraulic pump P2 can be reduced. As a result, it is possible to accurately perform horsepower control in accordance with the load of the engine 32.

Further, the controller 25 may calculate the second control line L2 by increasing the shift amount of the first control line L1 as the temperature of at least one selected from a group consisting of the hydraulic fluid (including pilot fluid) provided in the working machine 1, cooling water for cooling various devices mounted on the working machine 1, and engine oil in the engine 32 increases. Then, the controller 25 may set the LS differential pressure on the basis of the second control line L2 and the actual rotational speed of the engine 32, and cause the hydraulic control unit 75 to realize the LS differential pressure.

Alternatively, the controller 25 may change the LS differential pressure on the basis of the temperature of at least one selected from a group consisting of the hydraulic fluid, the cooling water, and the engine oil provided in the working machine 1. The controller 25 is connected to a second measurement device 83 (FIG. 1A) that measures the temperature of fluid flowing through a flow path disposed in the working machine 1. The second measurement device 83 measures the temperature of at least one selected from a group consisting of hydraulic fluid flowing through a fluid passage disposed in the working machine 1, cooling water flowing through a water passage and to be used for cooling the engine 32 and other devices, and engine oil flowing through a fluid passage disposed in the engine 32. Upon acquiring the temperature measured by the second measurement device 83, the controller 25 executes a first determination and/or a second determination. The first determination is to determine whether the temperature of the fluid is equal to or less than a corresponding predetermined lower limit threshold. The second determination is to determine whether the temperature of the fluid is equal to or greater than a corresponding predetermined upper limit threshold.

The lower limit threshold and the upper limit threshold are predetermined temperatures of the fluid that are set to determine, based on the temperature of the fluid, whether the working machine 1 has good heat balance. For example, when the temperature of the hydraulic fluid or the temperature of the engine oil is equal to or less than about −20° C., the controller 25 determines that the working machine 1 does not have good heat balance because the hydraulic fluid or the engine oil has high viscosity. Also when the temperature of the hydraulic fluid or the engine oil is equal to or greater than about 60° C., the controller 25 determines that the working machine 1 does not have good heat balance.

As described above, the controller 25 acquires the temperature of the fluid (at least one selected from a group consisting of the hydraulic fluid, the cooling water, and the engine oil) measured by the second measurement device 83, makes a comparison between the temperature of the fluid with the upper limit threshold or the lower limit threshold, and determines whether the working machine 1 has good heat balance, based on the result of the comparison. If the working machine 1 does not have good heat balance, that is, if the temperature of the fluid is equal to or less than the lower limit threshold or if the temperature of the fluid is equal to or greater than the upper limit threshold, the controller 25 calculates the second control line L2 by shifting the first control line L1 in the direction in which the LS differential pressure decreases. At this time, the controller 25 may calculate the second control line L2 by increasing the shift amount of the first control line L1 as the difference between the temperature of the fluid and the upper limit threshold or the lower limit threshold increases. Upon calculating the second control line L2, the controller 25 sets the LS differential pressure on the basis of the second control line L2 and the actual rotational speed of the engine 32, and outputs a control signal corresponding to the set LS differential pressure to the solenoid valve 81 to realize the LS differential pressure.

With the operation described above, when the working machine 1 does not have good heat balance, the delivery amount of the hydraulic fluid from the second hydraulic pump P2 can be reduced. As a result, it is possible to accurately perform horsepower control of the working system of the working machine 1 in accordance with the load of the engine 32, and it is also possible to encourage the working machine 1 to have good heat balance.

Figure 2C:
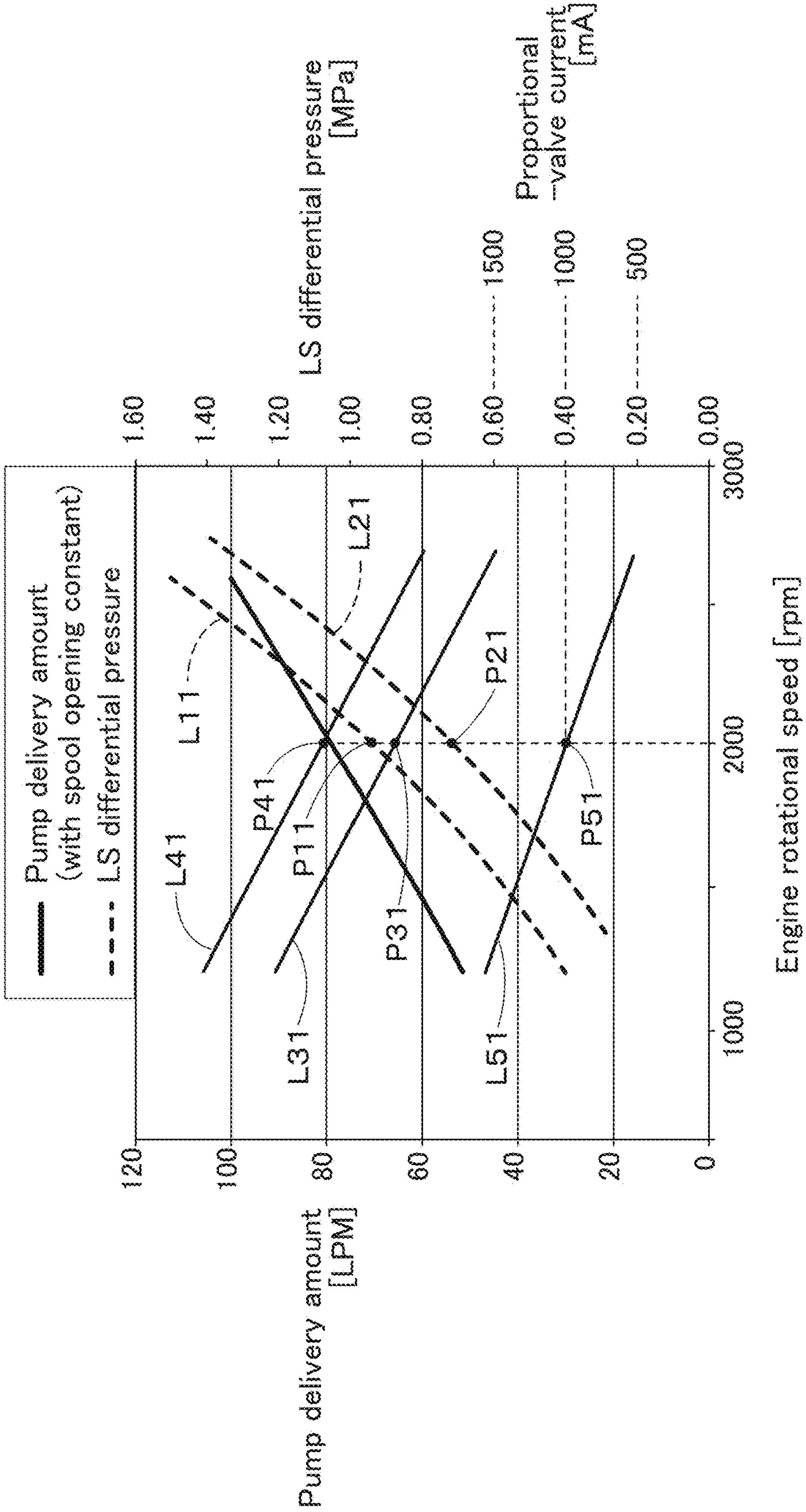
FIG. 2C is a graph illustrating a relationship between an LS differential pressure and pressures to be applied to an opening changing unit in a low-temperature period and in a room-temperature period according to the first preferred embodiment of the present invention.

FIG. 2C is a diagram illustrating a relationship among the engine rotational speed of the working machine 1, a first control line L11 indicating the LS differential pressure of the hydraulic fluid in the low-temperature period, a second control line L21 indicating the LS differential pressure of the hydraulic fluid in the room-temperature period, a line L31 indicating the pressure on the housing 76B in the low-temperature period, a line L41 indicating the pressure on the housing 76B in the room-temperature period, and a line L51 indicating a current characteristic of the solenoid valve 81. In FIG. 2C, the pump delivery amount is the delivery amount of the hydraulic fluid from the second hydraulic pump P2 when the spools of the control valves 56 (the boom control valve 56A, the bucket control valve 56B, and the auxiliary control valve 56C) have a constant (maximum) opening area. The low-temperature period includes a period during which the hydraulic fluid is at low temperatures, and a low temperature environment.

The relationship illustrated in FIG. 2C among the engine rotational speed, the LS differential pressures in the low-temperature period and the room-temperature period, the pump delivery amount, and the pressures on the housing 76B in the low-temperature period and the room-temperature period is derived based on results of experiments or simulations performed in advance, for example. Data indicating the relationship is stored in the storage unit 26 included in the controller 25. The data indicating the relationship may be, for example, data of a graph as illustrated in FIG. 2C, data of a table as illustrated in FIG. 2B, or data of a function for calculating the LS differential pressure from the actual rotational speed of the engine 32. That is, the relationship among the engine rotational speed, the LS differential pressure, and the pump delivery amount may be data of any form that allows the corresponding LS differential pressure to be determined from the actual rotational speed of the engine 32. The relationship illustrated in FIG. 2C among the engine rotational speed, the LS differential pressures in the low-temperature period and the room-temperature period, the pump delivery amount, and the pressures on the housing 76B in the low-temperature period and the room-temperature period is hereinafter referred to as a control map, for convenience of description.

In FIG. 2C, the first control line L11 indicating the LS differential pressure in the low-temperature period and the second control line L21 indicating the LS differential pressure in the room-temperature period, which are indicated by broken lines, each represent a change in LS differential pressure with the engine rotational speed. In FIG. 2C, thick solid lines each represent a change in pump delivery amount with the engine rotational speed in a period during which the hydraulic fluid is at low temperatures.

As indicated by the first control line L11 and the second control line L21 illustrated in FIG. 2C, as the engine rotational speed increases, the LS differential pressures also increase. As indicated by the line L31, the pressure on the housing 76B in the low-temperature period decreases as the engine rotational speed increases. As indicated by the line L41, the pressure on the housing 76B in the room-temperature period decreases as the engine rotational speed increases. As indicated by the line L51, the current flowing through the solenoid valve 81 decreases as the engine rotational speed increases.

Upon acquiring the actual rotational speed of the engine 32, which is measured by the first measurement device 82, from the first measurement device 82, the controller 25 sets the LS differential pressure corresponding to the acquired actual rotational speed on the basis of the control map illustrated in FIG. 2C. Specifically, at an engine rotational speed of 2000 rpm, the controller 25 sets a control signal for the solenoid valve 81 corresponding to the engine rotational speed (i.e., about 2000 rpm) by using the line L51. In the illustrated example, the controller 25 sets a control signal indicating a current value P51 (about 1000 mA) of the solenoid valve 81 corresponding to the engine rotational speed (about 2000 rpm), outputs the set control signal to the solenoid valve 81, and changes the opening of the solenoid valve 81. The control signal for the solenoid valve 81, which is set by the controller 25, may be generated by the controller 25 in accordance with an arithmetic expression or control data stored in advance in the storage unit 26.

As described above, in response to a change in the opening of the solenoid valve 81 in accordance with the control signal from the controller 25, the pilot fluid from the solenoid valve 81 is supplied to the housing 76B of the opening changing unit 76, and the pilot pressure (the second pressure PA) acting on the opening changing unit 76 is changed. When the hydraulic fluid is at room temperature, the pressure on the housing 76B has a pressure value P41 indicated by the line L41, the second hydraulic pump P2 is controlled by the opening changing unit 76, the flow rate compensation valve 72, and the swash plate changing unit 73, and the LS differential pressure corresponding to the current value P51 (1000 mA) of the solenoid valve 81 is set to a value P21. When the hydraulic fluid is at a low temperature, by contrast, the pressure on the housing 76B has a pressure value P31 indicated by the line L31, the second hydraulic pump P2 is controlled by the opening changing unit 76, the flow rate compensation valve 72, and the swash plate changing unit 73, and the LS differential pressure corresponding to the current value P51 (1000 mA) of the solenoid valve 81 is set to a value P11. As described above, as illustrated in FIG. 2C, the first control line L11 indicating the LS differential pressure of the hydraulic fluid in the low-temperature period is larger than the second control line L21 indicating the LS differential pressure of the hydraulic fluid in the room-temperature period without a change in the current value P51 (about 1000 mA) of the solenoid valve 81 between the room-temperature period and the low-temperature period. That is, the LS differential pressure in the low-temperature period can be larger than in the room-temperature period.

As described above, the controller 25 does not perform control corresponding to the temperature for the current value of the solenoid valve 81 (for example, control to correct or modify the current value in accordance with the temperature of the hydraulic fluid) regardless of whether the hydraulic fluid is at room temperature or low temperature.

That is, no need exists to control the current value to the solenoid valve 81 in accordance with the temperature.

Second Preferred Embodiment

Figure 3:
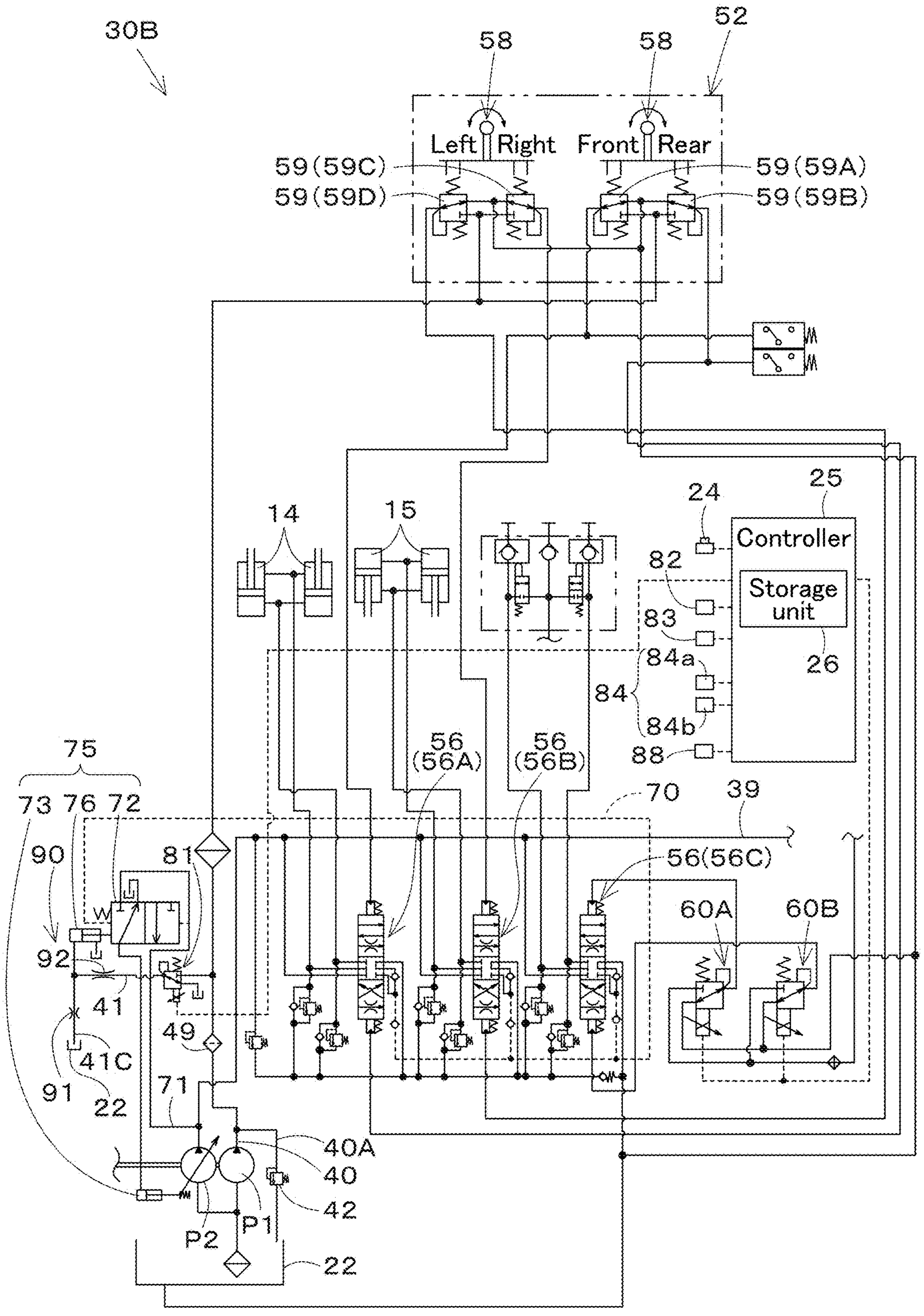
FIG. 3 is an overall view of a hydraulic system for a working system of a working machine according to a second preferred embodiment of the present invention.

FIG. 3 is a diagram illustrating a hydraulic system 30B for the working machine 1 according to a second preferred embodiment. In the second preferred embodiment, a configuration similar to that of the first preferred embodiment will not be described.

In the hydraulic system 30B according to the second preferred embodiment illustrated in FIG. 3, a command member 88 that gives a command to change the LS differential pressure is connected to the controller 25. The command member 88 is an operation switch disposed near the operator's seat 8. When the command member 88 is turned on, an electric signal for providing a command to change the LS differential pressure is generated from an electric circuit that operates in conjunction with the command member 88. The generated electric signal (hereinafter simply referred to as "change command") is input to the controller 25. Before the command member 88 is turned on, or when the command member 88 is in an off state, the change command of the LS differential pressure is not generated or is not input to the controller 25.

Figure 4A:
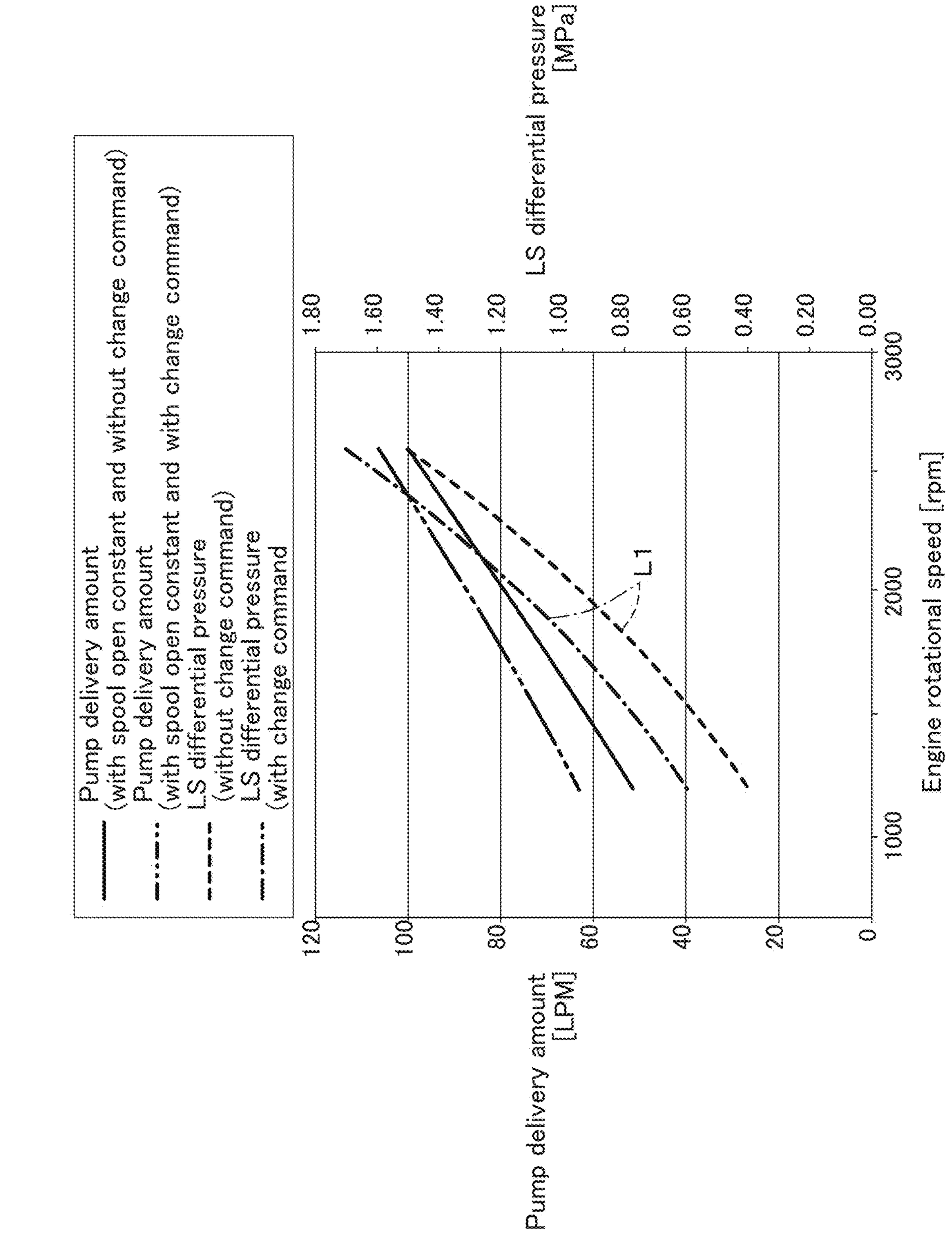
FIG. 4A is a graph illustrating a relationship among an engine rotational speed, an LS differential pressure, and a pump delivery amount according to the second preferred embodiment of the present invention.

FIG. 4A is a graph illustrating a relationship among the engine rotational speed, the LS differential pressure, and the pump delivery amount in the working machine 1 in accordance with whether the change command of the LS differential pressure is generated. FIG. 4B is a table illustrating the same relationship as that illustrated in FIG. 4A. Control maps illustrated in FIGS. 4A and 4B are stored in advance in the storage unit 26.

As illustrated in FIGS. 4A and 4B, in a case where the change command of the LS differential pressure is not input from the command member 88 to the controller 25 (without the change command), the relationship between the engine rotational speed, the LS differential pressure, and the pump delivery amount (a control line L1 indicated by a broken line in FIG. 4A and the first to third columns from the left in FIG. 4B) is the same as the relationship between the engine rotational speed, the LS differential pressure, and the pump delivery amount illustrated in FIGS. 2A and 2B. In a case where the change command of the LS differential pressure is input from the command member 88 to the controller 25 (with the change command generated), the LS differential pressure and the pump delivery amount corresponding to the engine rotational speed are higher than those in a case where the change command is not generated (a control line L1 indicated by a one dot chain line in FIG. 4A, and the first, fourth, and fifth columns from the left in FIG. 4B).

The controller 25 sets the LS differential pressure on the basis of whether the change command is generated from the command member 88, and on the basis of the actual rotational speed of the engine 32, which is measured by the first measurement device 82, and the control map illustrated in FIG. 4A or 4B, and outputs a control signal corresponding to the set LS differential pressure to the solenoid valve 81. Accordingly, the opening of the solenoid valve 81 is changed in accordance with the control signal, and the LS differential pressure corresponding to the control signal is realized. That is, in a case where the change command of the LS differential pressure is generated from the command member 88, the LS differential pressure is changed in accordance with the actual rotational speed of the engine 32, which is measured by the first measurement device 82.

Further, as illustrated in FIGS. 4A and 4B, the controller 25 sets the LS differential pressure obtained in a case where the change command of the LS differential pressure is generated from the command member 88 to a value larger than the LS differential pressure obtained in a case where the change command of the LS differential pressure is not generated from the command member 88. That is, in a case where the change command of the LS differential pressure is generated from the command member 88, the LS differential pressure is larger than that in a case where the change command of the LS differential pressure is not generated from the command member 88.

With the operation described above, for example, the operator of the working machine 1 who desires to operate the attachments of the working device 4, that is, the hydraulic actuators (the boom cylinders 14, the bucket cylinders 15, and the hydraulic actuator of the auxiliary attachment), more quickly than usual turns on the command member 88 to increase the LS differential pressure, thereby increasing the delivery amount of the hydraulic fluid from the second hydraulic pump P2. As a result, the working machine 1 enters a high-speed mode, which enables quick operation of the hydraulic actuators of the working device 4.

Third Preferred Embodiment

In a third preferred embodiment, the accelerator member 84 is also used as a command member ("command generator"). That is, in response to an operation of the first accelerator member 84*a* and/or the second accelerator member 84*b* of the accelerator member 84, the rotational speed of the engine 32 can be set, and the change command of the LS differential pressure can be generated. The configuration of a hydraulic system for the working machine 1 according to the third preferred embodiment is similar to the configuration of the hydraulic system 30A according to the first preferred embodiment illustrated in FIG. 1A, and thus description thereof will be omitted.

For example, in response to an operation of the first accelerator member 84*a* and/or the second accelerator member 84*b*, a predetermined electric signal is input to the controller 25 from an electric circuit (not illustrated) that operates in conjunction with the operated accelerator member. In accordance with the electric signal, the controller 25 sets the target engine rotational speed and determines that the change command of the LS differential pressure is generated.

In a case where both the first accelerator member 84*a* and the second accelerator member 84*b* are operated, the controller 25 sets the first target engine rotational speed in accordance with an electric signal input in response to the operation of the first accelerator member 84*a*, and sets the second target engine rotational speed in accordance with an electric signal input in response to the operation of the second accelerator member 84*b*. The controller 25 adopts the larger one of the first target engine rotational speed and the second target engine rotational speed as the target engine rotational speed. Further, the controller 25 controls the driving of the engine 32 on the basis of the adopted target engine rotational speed and the actual rotational speed of the engine 32 so that the engine rotational speed of the engine 32 matches the target engine rotational speed. Further, the controller 25 sets the LS differential pressure (the change value of the LS differential pressure) on the basis of the rotational speed that is not adopted as the target engine rotational speed, that is, the smaller one of the first target engine rotational speed and the second target engine rotational speed.

For example, the first accelerator member 84*a* is operated by a maximum amount or a predetermined amount or more that is slightly smaller than the maximum amount to set the first target engine rotational speed to a maximum value or a value slightly smaller than the maximum value, and the second accelerator member 84*b* is operated by an operation amount smaller than the amount of operation of the first accelerator member 84*a* to set the second target engine rotational speed to a value smaller than the first target engine rotational speed. In this case, the controller 25 adopts the first target engine rotational speed as the target engine rotational speed, and sets the LS differential pressure on the basis of the second target engine rotational speed.

Conversely, the second accelerator member 84*b* is operated by a maximum amount or a predetermined amount or more that is slightly smaller than the maximum amount to set the second target engine rotational speed to a maximum value or a value slightly smaller than the maximum value, and the first accelerator member 84*a* is operated by an operation amount smaller than the amount of operation of the second accelerator member 84*b* to set the first target engine rotational speed to a value smaller than the second target engine rotational speed. In this case, the controller 25 adopts the second target engine rotational speed as the target engine rotational speed, and sets the LS differential pressure on the basis of the first target engine rotational speed.

Figure 5:
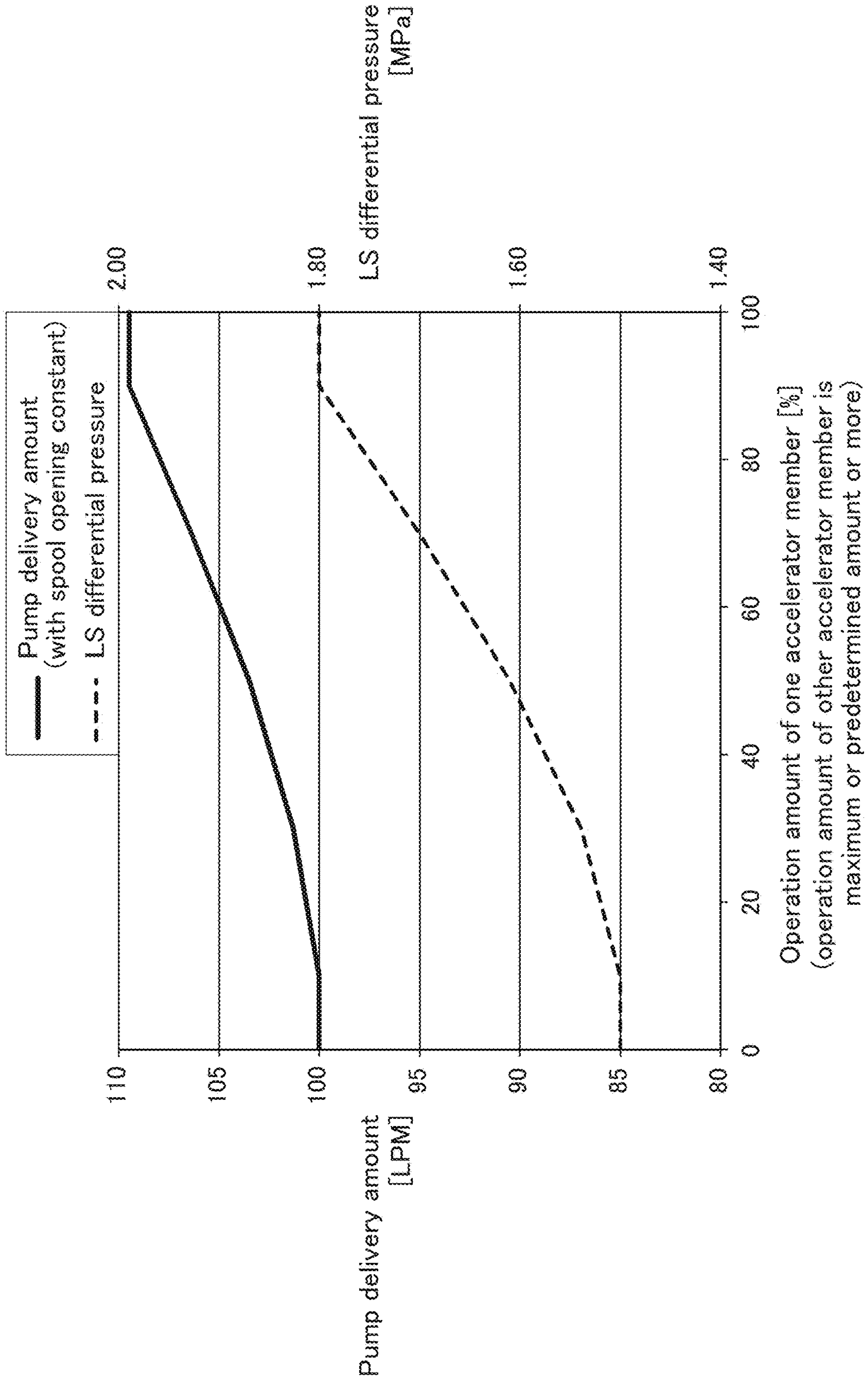
FIG. 5 is a graph illustrating a relationship among an amount of operation of one of two accelerator members when an amount of operation of the other accelerator member is the maximum amount or is a predetermined amount or more, an LS differential pressure, and a pump delivery amount according to a third preferred embodiment of the present invention.

FIG. 5 is a graph illustrating a relationship among the amount of operation of one of the first accelerator member 84*a* and the second accelerator member 84*b* when the amount of operation of the other accelerator member is the maximum amount or is the predetermined amount or more, the LS differential pressure, and the pump delivery amount. FIG. 6 is a table illustrating the same relationship as that illustrated in FIG. 5. Control maps illustrated in FIGS. 5 and 6 are stored in advance in the storage unit 26.

When the amount of operation of one of the first accelerator member 84*a* and the second accelerator member 84*b* is equal to or less than a small (slightly larger than 0%) predetermined amount (10%) and the amount of operation of the other accelerator member is the maximum amount (100%) or is a large (slightly smaller than 100%) predetermined amount (90%) or more, the control maps illustrated in FIGS. 5 and 6 indicate that the LS differential pressure is the minimum value, or 1.50 MPa. As presented in the first preferred embodiment (FIGS. 2A and 2B) and the second preferred embodiment (FIGS. 4A and 4B), the minimum value (about 1.50 MPa) of the LS differential pressure is the same value as the LS differential pressure (about 1.50 MPa) when the engine rotational speed is the maximum value (about 2600 rpm) (in the second preferred embodiment, when the change command is not generated and the engine rotational speed is the maximum value). That is, even when one of the first accelerator member 84*a* and the second accelerator member 84*b* is not in operation, if the amount of operation of the other accelerator member is the maximum amount or is the large predetermined amount or more, the LS differential pressure is set to the minimum value.

In the control maps illustrated in FIGS. 5 and 6, furthermore, the LS differential pressure increases as the amount of operation of one accelerator member increases. When the amount of operation of one accelerator member becomes equal to or greater than the large (slightly smaller than 100%) predetermined amount (90%), the LS differential pressure reaches the maximum value, i.e., 1.80 MPa.

The controller 25 sets the LS differential pressure on the basis of the amount of operation of an accelerator member having a smaller amount of operation (including an amount of operation of 0%) among the first accelerator member 84*a* and the second accelerator member 84*b* and on the basis of the control map illustrated in FIG. 5 or 6, and outputs a control signal corresponding to the set LS differential pressure to the solenoid valve 81. Accordingly, the opening of the solenoid valve 81 is changed in response to the control signal, and the LS differential pressure corresponding to the control signal is realized.

That is, in a case where the operator of the working machine 1 operates both the first accelerator member 84*a* and the second accelerator member 84*b*, the rotational speed of the engine 32 can be changed in accordance with the operation of an accelerator member having a larger amount of operation among the first accelerator member 84*a* and the second accelerator member 84*b* to operate the travel speed of the working machine 1. Further, the delivery amount of the hydraulic fluid from the second hydraulic pump P2 can also be changed by changing the LS differential pressure in accordance with the operation of the other accelerator member having a smaller amount of operation. In particular, in response to the operator operating both the first accelerator member 84*a* and the second accelerator member 84*b* with a large amount of operation, the LS differential pressure can be increased, and the delivery amount of the hydraulic fluid from the second hydraulic pump P2 can be increased. As a result, it is possible to accurately perform horsepower control of the working machine 1 in accordance with the operating states of the accelerator member 84 (the first accelerator member 84*a* and the second accelerator member 84*b*).

In the preferred embodiment described above, the delivery amount of the hydraulic fluid from the second hydraulic pump P2 is increased by the hydraulic control unit 75, which enables an improvement (increase) in the operating speed of the hydraulic actuators.

Fourth Preferred Embodiment

A working machine 1 according to a fourth preferred embodiment is a backhoe. The backhoe includes a traveling machine base equipped with a pair of left and right crawler traveling devices, and a swivel base equipped with an engine and a boarding operation unit. The swivel base is mounted in an upper portion of the traveling machine base so as to be capable of fully swiveling about a vertical axis. The swivel base has a front portion provided with a front working device including a boom, an arm, and a bucket that are sequentially coupled to each other. The traveling machine base has a front portion provided with a blade for dozer work.

Figure 7:
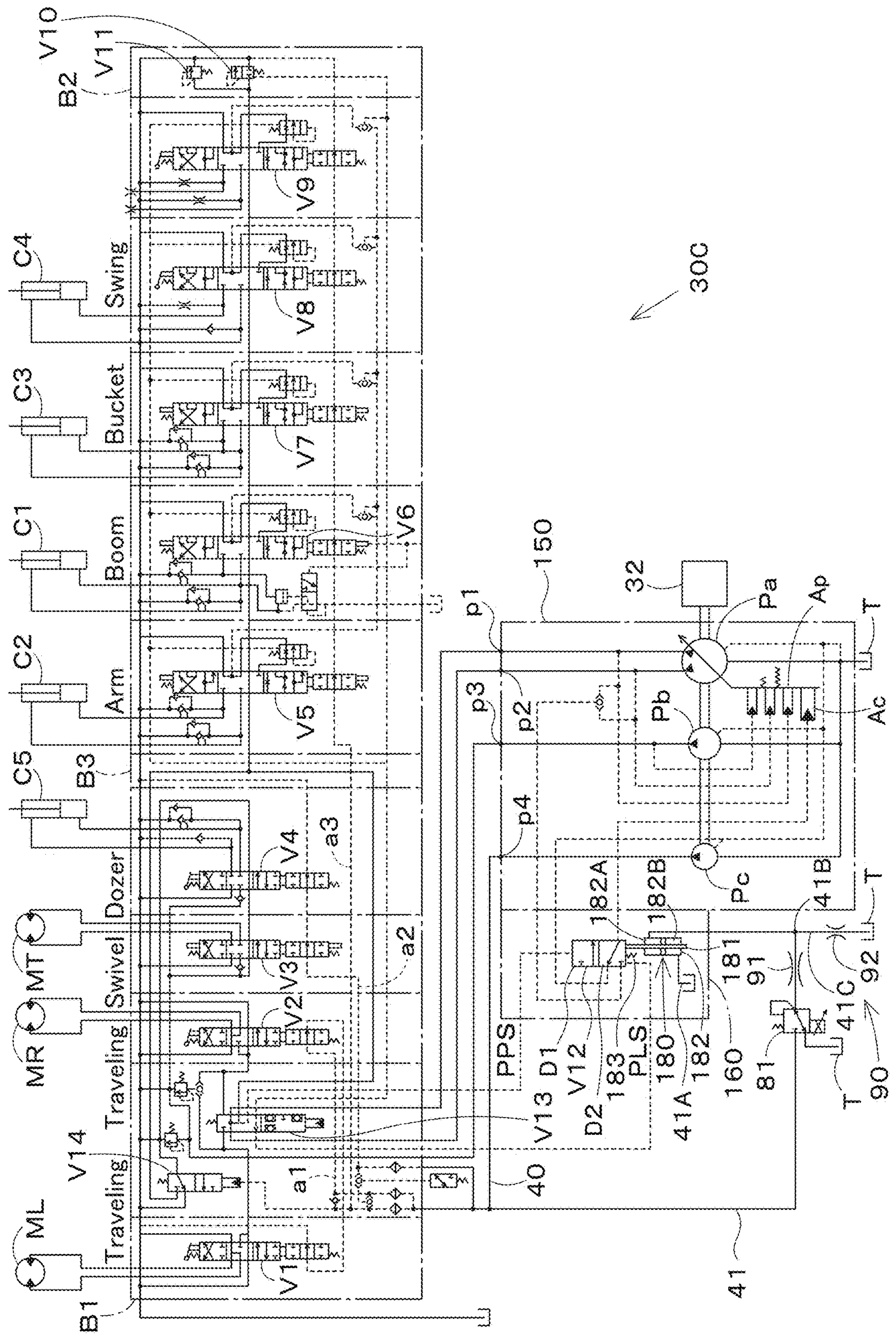
FIG. 7 is an overall view of a hydraulic system for a working machine according to a fourth preferred embodiment of the present invention.

FIG. 7 is an overall view of a hydraulic system 30C for the working machine 1 according to the fourth preferred embodiment. The hydraulic system 30C for the working machine 1 according to the fourth preferred embodiment includes traveling hydraulic motors ML and MR, a swivel hydraulic motor MT, various cylinders C1 to C5, various control valves V1 to V11, V13, and V14, an inlet block B1, an outlet block B2, an intermediate spacer block B3, a pressure-fluid supply unit 150, and a pressure compensation unit 90. The left traveling device is driven to rotate in forward and reverse directions by the traveling hydraulic motor ML, and the right traveling device is driven to rotate in forward and reverse directions by the traveling hydraulic motor MR. The swivel base is driven to swivel to the left and right by the swivel hydraulic motor MT. The boom, the arm, and the bucket of the front working device are driven by a boom cylinder C1, an arm cylinder C2, and a bucket cylinder C3, respectively. The entire front working device is driven to swing to the left and right of the swivel base around a vertical axis by a swing cylinder C4. The blade is driven up and down by a dozer cylinder C5.

The control valves V1 and V2, which are for left and right travel control valves, are manually operated control valves having spools that are directly switched by left and right traveling levers disposed on a control tower located in front of the operator's seat 8, respectively. The control valves V4, V8, and V9, which are for dozer, swing, and auxiliary work, respectively, are each a manually operated control valve having a spool that is directly operated by lever operation or pedal operation. The control valves V3, V5, V6, and V7, which are for swiveling, the arm, the boom, and the bucket, respectively, are each a hydraulic pilot operated control valve that is operated and set at an opening corresponding to an amount of lever operation by using a pilot pressure supplied from a pilot valve (not illustrated). The pilot valve is operated with a pair of left and right working levers disposed in the control tower such that each of the left and right working levers can be operated up, down, left, and right.

The control valves V1 to V9 have valve blocks that are arranged in parallel with each other together with the inlet block B1, the outlet block B2, and the intermediate spacer block B3. The valve blocks are coupled to each other by an internal fluid passage. The inlet block B1 is disposed between the valve block of the left travel control valve V1 and the valve block of the right travel control valve V2. The outlet block B2 is coupled, as a terminal block, to the outside of the valve block of the control valve V9 for auxiliary work.

The pressure-fluid supply unit 150 includes three hydraulic pumps Pa, Pb, and Pc. The hydraulic pumps Pa, Pb, and Pc are driven by the engine 32. The pressure-fluid supply unit 150 has four delivery ports p1 to p4, and the delivery ports p1 to p4 are connected to the inlet block B1 by pipes. The pump Pa is an axial plunger pump with two sets of plungers assembled to a single rotor such that the same amount of pressure fluid is delivered from the pair of independent delivery ports p1 and p2. The pump Pa is of a variable displacement type in which the delivery amount of the pressure fluid from the delivery ports p1 and p2 is variable by changing the angle of the swash plate thereof. The flow rate of the pump Pa is controlled by a load sensing system. The hydraulic system 30C for the working machine 1 according to the fourth preferred embodiment includes the load sensing system. The load sensing system includes a flow rate control unit 160. The flow rate control unit 160 is connected to the inlet block B1 by a pipe. The pump Pb is mainly used for swiveling and dozer work. In an example, the pump Pb is a fixed-displacement gear pump. The pump Pc is a pilot pressure supply pump composed of a fixed-displacement gear pump. The pump Pc supplies the pilot pressure to a pilot fluid passage a1, a pilot fluid passage a2, and a pilot fluid passage a3. The pilot fluid passage a1 is connected in communication with a valve spool of a travel section. The pilot fluid passage a2 is connected in communication with valve spools of swiveling and dozer sections. The pilot fluid passage a3 is connected in communication with a valve spool of a load sensing section.

The load sensing system is a system for controlling the pump delivery amount in accordance with a work load pressure and delivering hydraulic power required for a load from a pump to save power and improve operability. In the illustrated example, the load sensing system is configured to implement functions on an arm section, a boom section, a bucket section, a swing section, and an auxiliary work section of the front working device. In the illustrated example, further, an after-orifice load sensing system is used in which pressure compensation valves are connected after the spools of the control valves V5 to V9 in the respective sections. In the illustrated example, the load sensing system includes an unloading valve V10 and a system relief valve V11. The unloading valve V10 and the system relief valve V11 are incorporated in the outlet block B2, which is located most downstream.

As illustrated in FIG. 7, the flow rate control unit 160 includes a flow rate compensation valve V12 (flow rate compensation valve). The pressure-fluid supply unit 150 includes a flow rate compensation piston Ac for the flow control of the pump Pa, and a horsepower control piston Ap such that the highest load pressure among the load pressures on load detection lines in the respective sections can be transmitted as a control signal pressure PLS to the flow rate compensation valve V12 of the flow rate control unit 160 via a signal line.

As illustrated in FIG. 7, the control differential pressure to be applied to the flow rate compensation valve V12 of the flow rate control unit 160 is provided by an opening changing unit 180. Specifically, the opening changing unit 180 includes a differential pressure piston 181, a housing 182 that houses the differential pressure piston 181, and a spring 183. The housing 182 includes a first housing 182A located closer to the flow rate compensation valve V12 and a second housing 182B located farther from the flow rate compensation valve V12. A discharge fluid passage 41A connects the second housing 182B to a hydraulic fluid tank T. The control differential pressure to be applied to the flow rate compensation valve V12 is provided by the differential pressure piston 181 and the spring 183. In response to an increase in the delivery amount of the pump Pc with an increase in the rotational speed of the engine 32, the control differential pressure component to be provided by the differential pressure piston 181 increases, and the pump Pa is controlled such that the flow rate of the pump Pa is increased. Conversely, in response to a decrease in the delivery amount of the pump Pc with a decrease in the rotational speed of the engine 32, the control differential pressure component to be provided by the differential pressure piston 181 decreases, and the pump Pa is controlled such that the flow rate of the pump Pa is decreased.

The delivery port p4 to the inlet block B1 are connected by a first pilot fluid passage 40, and a second pilot fluid passage 41 is connected to an intermediate portion of the first pilot fluid passage 40. The second pilot fluid passage 41 is provided with a solenoid valve 81. The second pilot fluid passage 41 is connected to the housing 182 (specifically, the first housing 182A) of the opening changing unit 180.

The hydraulic system 30C for the working machine 1 according to the fourth preferred embodiment includes the pressure compensation unit 90. The pressure compensation unit 90 includes a discharge fluid passage 41C, a first throttle 91, and a second throttle 92. The discharge fluid passage 41C branches off from the second pilot fluid passage 41 at a branch point 41B between the solenoid valve 81 and the opening changing unit 180 such that a portion of the pilot fluid is discharged to the hydraulic fluid tank T. The first throttle 91 is a choke throttle located between the solenoid valve 81 and the branch point 41B in the second pilot fluid passage 41. The second throttle 92 is an orifice throttle having a different flow rate characteristic from the first throttle 91, and is located in the discharge fluid passage 41C.

The flow rate compensation valve V12 allows the flow rate compensation piston Ac to move in accordance with the changed opening, and activates the swash plate changing unit 73 so as to change the angle of the swash plate to change the delivery amount of the hydraulic fluid (pilot fluid) from the pump Pa (second hydraulic pump). As the flow rate compensation piston Ac is pushed more, the angle of the swash plate of the pump Pa decreases. As a result, the delivery amount of the hydraulic fluid from the pump Pa decreases.

In the fourth preferred embodiment, as the pressure of the solenoid valve 81 (proportional valve) increases, the pilot fluid flowing to the first housing 182A of the opening changing unit 180 increases, resulting in an increase in the pilot fluid to be supplied from the flow rate compensation valve V12 (flow rate compensation valve) to the flow rate compensation piston Ac. As a result, the flow rate compensation piston Ac is further pushed, and the delivery amount of the hydraulic fluid from the pump Pa decreases. That is, in the hydraulic system 30C according to the fourth preferred embodiment, as the pressure of the solenoid valve 81 (proportional valve) increases (i.e., as the pressure to be applied to the differential pressure piston 181 increases), the delivery amount of the hydraulic fluid from the pump Pa decreases. Accordingly, the hydraulic system 30C according to the fourth preferred embodiment is configured such that the LS differential pressure decreases as the pressure of the solenoid valve 81 increases.

Further, the hydraulic system 30C according to the fourth preferred embodiment allows the hydraulic fluid to be delivered from the pump Pa even in case of failure of the solenoid valve 81 (proportional valve) due to a harness disconnection or the like, and is configured to be fail-safe.

Here, a description will be given of a case where the hydraulic fluid is at a low temperature and a case where the hydraulic fluid is at a high temperature.

Hydraulic Fluid at Low Temperature

When the hydraulic fluid (pilot fluid) is at a low temperature, the pressure loss caused by the choke throttle (the first throttle 91) increases (the pressure loss with respect to the flow rate increases), and the flow rate of the hydraulic fluid flowing from the solenoid valve 81 (proportional valve) to the first housing 182A of the opening changing unit 180 decreases compared to when the hydraulic fluid is at a high temperature. In the low-temperature period, thus, the pressure to be applied to the differential pressure piston 181 of the opening changing unit 180 is smaller than in the high-temperature period. Then, the amount of pilot fluid to be supplied from the flow rate compensation valve V12 (flow rate compensation valve) to the flow rate compensation piston Ac decreases, and the flow rate compensation piston Ac is not pushed more than in the high-temperature period, resulting in an increase in the delivery amount of the hydraulic fluid from the pump Pa. As a result, in the low-temperature period, the LS differential pressure is larger than in the high-temperature period.

When the hydraulic fluid (pilot fluid) is at a high temperature, the pressure loss caused by the choke throttle (the first throttle 91) decreases (the pressure loss with respect to the flow rate decreases), and the flow rate of the hydraulic fluid flowing from the solenoid valve 81 (proportional valve) to the first housing 182A of the opening changing unit 180 increases compared to when the hydraulic fluid is at a low temperature. In the high-temperature period, thus, the pressure to be applied to the differential pressure piston 181 of the opening changing unit 180 is larger than in the low-temperature period. The amount of pilot fluid to be supplied from the flow rate compensation valve V12 (flow rate compensation valve) to the flow rate compensation piston Ac increases, and the flow rate compensation piston Ac is pushed more than in the low-temperature period, resulting in a decrease in the delivery amount of the hydraulic fluid from the pump Pa. As a result, in the high-temperature period, the LS differential pressure is smaller than in the low-temperature period.

The configuration according to the fourth preferred embodiment allows the pressure compensation unit 90 to decrease the pilot pressure as the temperature of the pilot fluid decreases. Accordingly, in the configuration for performing horsepower control by using the solenoid valve 81 (proportional valve), it is possible to perform temperature correction of pilot pressure with a simple configuration. That is, the configuration for performing horsepower control by using the solenoid valve 81 (proportional valve) can increase the delivery amount of the pump Pa in the low-temperature period, and can decrease the delivery amount of the pump Pa in the high-temperature period. Therefore, the LS differential pressure in the low-temperature period can be larger than that in a room-temperature period. Further, the LS differential pressure can be made to decrease as the pressure of the solenoid valve 81 (proportional valve) increases (i.e., as the pressure to be applied to the second housing 182B of the opening changing unit 180 increases).

First Modification of Fourth Preferred Embodiment

Figure 8:
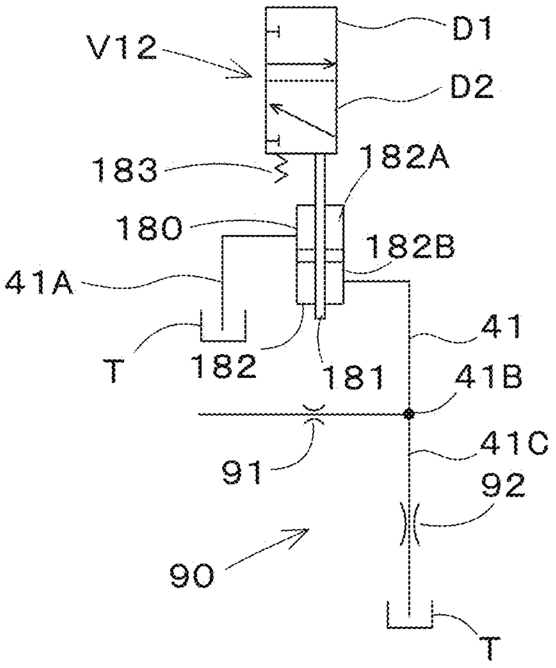
FIG. 8 is a diagram of a hydraulic circuit according to a first modification of the fourth preferred embodiment of the present invention.

Next, a hydraulic system according to a first modification of the fourth preferred embodiment will be described with reference to FIG. 8. The hydraulic system according to the first modification of the fourth preferred embodiment is different from the hydraulic system 30C according to the fourth preferred embodiment in that the first throttle 91 is an orifice throttle, the second throttle 92 is a choke throttle and in that the connection of the opening changing unit 180 is different. In the connection of the opening changing unit 180, specifically, as illustrated in FIG. 8, the second pilot fluid passage 41 is connected to the second housing 182B of the opening changing unit 180. In addition, the discharge fluid passage 41A connects the first housing 182A to the hydraulic fluid tank T.

When the temperature of the pilot fluid changes to a second temperature lower than a first temperature, the pressure compensation unit 90 changes the pilot pressure to a pilot pressure for the second temperature. The pilot pressure for the second temperature is higher than a pilot pressure for the first temperature.

The opening changing unit 180 changes the opening of the flow rate compensation valve V12 (flow rate compensation valve) in accordance with the pilot pressure for the second temperature to which the pilot pressure is changed by the pressure compensation unit 90.

In the first modification of the fourth preferred embodiment illustrated in FIG. 8, as the pressure of the solenoid valve 81 (proportional valve) increases, the pressure of the pilot fluid flowing to the second housing 182B of the opening changing unit 180 increases, resulting in a decrease in the pilot fluid to be supplied from the flow rate compensation valve V12 (flow rate compensation valve) to the flow rate compensation piston Ac. As a result, the flow rate compensation piston Ac is not further pushed, and the delivery amount of the hydraulic fluid from the pump Pa increases. That is, the hydraulic system according to the first modification of the fourth preferred embodiment is configured such that as the pressure of the solenoid valve 81 (proportional valve) increases (i.e., as the pressure to be applied to the differential pressure piston 181 increases), the delivery amount of the hydraulic fluid from the pump Pa increases. Accordingly, the hydraulic system according to the first modification of the fourth preferred embodiment is configured such that the LS differential pressure increases as the pressure of the solenoid valve 81 increases.

Next, a description will be given of a case where the hydraulic fluid is at a low temperature and a case where the hydraulic fluid is at a high temperature.

Hydraulic Fluid at Low Temperature

When the hydraulic fluid (pilot fluid) is at a low temperature, the pressure loss caused by the choke throttle (the second throttle 92) increases (the pressure loss with respect to the flow rate increases), and the flow rate of the hydraulic fluid flowing from the solenoid valve 81 (proportional valve) to the hydraulic fluid tank T through the discharge fluid passage 41C decreases, resulting in a decrease in the differential pressure across the first throttle 91. Accordingly, the pressure to be applied to the differential pressure piston 181 of the opening changing unit 180 approaches the pressure output from the solenoid valve 81 (proportional valve). That is, the pilot pressure of the pilot fluid flowing into the second housing 182B of the opening changing unit 180 from the second pilot fluid passage 41 is larger than in the high-temperature period, and the differential pressure piston 181 moves in a direction to extend the differential pressure piston 181 (i.e., a direction approaching the flow rate compensation valve V12). As a result, the opening of the flow rate compensation valve V12 is changed. Then, the amount of pilot fluid to be supplied from the flow rate compensation valve V12 (flow rate compensation valve) to the flow rate compensation piston Ac decreases, and the flow rate compensation piston Ac is not pushed more than in the high-temperature period, resulting in an increase in the delivery amount of the hydraulic fluid from the pump Pa. As a result, in the low-temperature period, the LS differential pressure is larger than in the high-temperature period.

When the hydraulic fluid (pilot fluid) is at a high temperature, the pressure loss caused by the choke throttle (the second throttle 92) decreases (the pressure loss with respect to the flow rate decreases), and the flow rate of the hydraulic fluid flowing from the solenoid valve 81 (proportional valve) to the second housing 182B of the opening changing unit 180 decreases compared to when the hydraulic fluid is at low temperatures. In the high-temperature period, thus, the pressure to be applied to the differential pressure piston 181 of the opening changing unit 180 is smaller than in the low-temperature period. The amount of pilot fluid to be supplied from the flow rate compensation valve V12 (flow rate compensation valve) to the flow rate compensation piston Ac increases, and the flow rate compensation piston Ac is pushed more than in the low-temperature period, resulting in a decrease in the delivery amount of the hydraulic fluid from the pump Pa. As a result, in the high-temperature period, the LS differential pressure is smaller than in the low-temperature period.

The configuration according to the first modification of the fourth preferred embodiment allows the pressure compensation unit 90 to increase the pilot pressure as the temperature of the pilot fluid decreases. Accordingly, in the configuration for performing horsepower control by using the solenoid valve 81 (proportional valve), it is possible to perform temperature correction of pilot pressure with a simple configuration. That is, the configuration for performing horsepower control by using the solenoid valve 81 (proportional valve) can increase the delivery amount of the pump Pa in the low-temperature period, and can decrease the delivery amount of the pump Pa in the high-temperature period. Therefore, the LS differential pressure in the low-temperature period can be larger than that in a room-temperature period. Further, the LS differential pressure can be made to increase as the pressure of the solenoid valve 81 (proportional valve) increases (i.e., as the pressure to be applied to the second housing 182B of the opening changing unit 180 increases).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A hydraulic system for a working machine, the hydraulic system comprising:

a prime mover;

a hydraulic actuator;

a control valve to control activation of the hydraulic actuator;

a first hydraulic pump to be driven by power of the prime mover to deliver pilot fluid to switch the control valve;

a second hydraulic pump to be driven by power of the prime mover to deliver hydraulic fluid to activate the hydraulic actuator, the second hydraulic pump being a variable displacement hydraulic pump;

a hydraulic controller to control a delivery amount of the hydraulic fluid from the second hydraulic pump to set a load-sensing (LS) differential pressure, the LS differential pressure being a pressure difference between a delivery pressure of the hydraulic fluid from the second hydraulic pump and a highest load pressure of the hydraulic fluid when the hydraulic actuator is in operation;

a first pilot fluid passage through which the pilot fluid delivered from the first hydraulic pump flows;

a second pilot fluid passage branching off from the first pilot fluid passage and connected to the hydraulic controller;

a solenoid valve in the second pilot fluid passage to change a pilot pressure of the pilot fluid applied to the hydraulic controller; and a pressure compensator located between the solenoid valve and the hydraulic controller to increase the LS differential pressure as a temperature of the hydraulic fluid including the pilot fluid decreases.

2. The hydraulic system for a working machine according to claim 1, wherein the pressure compensator includes:

a discharge fluid passage branching off from the second pilot fluid passage at a branch point between the solenoid valve and the hydraulic controller to discharge the pilot fluid;

a first throttle in the second pilot fluid passage between the solenoid valve and the branch point; and a second throttle in the discharge fluid passage with a different flow rate characteristic from the first throttle.

3. The hydraulic system for a working machine according to claim 2, wherein the first throttle and the second throttle are different in at least one of throttle hole diameter or throttle length.

4. The hydraulic system for a working machine according to claim 3, wherein the first throttle and the second throttle are each a choke throttle, and are different in at least one of choke inside diameter or choke length, the choke inside diameter being a throttle hole diameter, the choke length being a throttle length.

5. The hydraulic system for a working machine according to claim 3, wherein the first throttle and the second throttle are each an orifice throttle, and are different in at least one of orifice diameter or orifice blade length, the orifice diameter being a throttle hole diameter, the orifice blade length being a throttle length and being a length of a portion with a narrowed diameter.

6. The hydraulic system for a working machine according to claim 3, wherein one of the first throttle and the second throttle is a choke throttle, and the other is an orifice throttle.

7. The hydraulic system for a working machine according to claim 6, wherein the first throttle is a choke throttle, and the second throttle is an orifice throttle.

8. The hydraulic system for a working machine according to claim 2, further comprising:

a first fluid passage to receive the highest load pressure of the hydraulic fluid when the hydraulic actuator is in operation;

a second fluid passage to receive the delivery pressure of the hydraulic fluid from the second hydraulic pump; and an electrical controller configured or programmed to control activation of the solenoid valve to adjust the pilot pressure to change the LS differential pressure.

9. The hydraulic system for a working machine according to claim 1, further comprising:

a first fluid passage to receive the highest load pressure of the hydraulic fluid when the hydraulic actuator is in operation;

a second fluid passage to receive the delivery pressure of the hydraulic fluid from the second hydraulic pump; and an electrical controller configured or programmed to control activation of the solenoid valve to adjust the pilot pressure to change the LS differential pressure.

10. The hydraulic system for a working machine according to claim 9, wherein the electrical controller is configured or programmed to control activation of the solenoid valve to change a pilot differential pressure, the pilot differential pressure being a pressure difference between a first pressure of the pilot fluid flowing into the solenoid valve and a second pressure of the pilot fluid output from the solenoid valve.

11. The hydraulic system for a working machine according to claim 10, wherein the first throttle is in the second pilot fluid passage between the solenoid valve and the hydraulic controller;

the electrical controller is configured or programmed to change the pilot differential pressure; and the pressure compensator is configured to change a differential pressure between the second pressure and a third pressure of the pilot fluid output from the first throttle as a temperature of the pilot fluid decreases.

12. The hydraulic system for a working machine according to claim 9, wherein the first hydraulic pump is a fixed-displacement hydraulic pump with a delivery flow rate that varies in accordance with a rotational speed of the prime mover;

the hydraulic controller includes:

a swash plate adjuster to change an angle of a swash plate included in the second hydraulic pump;

a flow rate compensation valve connected to the first fluid passage to supply the hydraulic fluid to the swash plate adjuster to activate the swash plate adjuster, and an opening adjuster connected to the second pilot fluid passage to change an opening of the flow rate compensation valve in accordance with the pilot pressure; and the electrical controller is configured or programmed to control activation of the solenoid valve to cause the opening adjuster to change the opening of the flow rate compensation valve to change the LS differential pressure.

13. The hydraulic system for a working machine according to claim 12, wherein the pressure compensator is operable to, in response to a change in a temperature of the pilot fluid to a second temperature lower than a first temperature, change the pilot pressure to a pilot pressure for the second temperature, the pilot pressure for the second temperature being higher than a pilot pressure for the first temperature, the opening adjuster is operable to change the opening of the flow rate compensation valve in accordance with the pilot pressure for the second temperature to which the pilot pressure is changed by the pressure compensator; and the flow rate compensation valve is operable to activate the swash plate adjuster so as to change the angle of the swash plate in accordance with the changed opening to change the delivery amount of the hydraulic fluid from the second hydraulic pump.

14. The hydraulic system for a working machine according to claim 9, further comprising:

a first measurement device to measure an actual rotational speed of the prime mover; wherein the electrical controller is configured or programmed to change the LS differential pressure, based on the actual rotational speed measured by the first measurement device.

15. The hydraulic system for a working machine according to claim 9, further comprising:

a first measurement device to measure an actual rotational speed of the prime mover; wherein the electrical controller is configured or programmed to change the LS differential pressure, based on a difference between the actual rotational speed measured by the first measurement device and a predetermined target rotational speed.

16. The hydraulic system for a working machine according to claim 9, further comprising:

a first measurement device to measure an actual rotational speed of the prime mover; wherein the electrical controller is configured or programmed to decrease the LS differential pressure when the actual rotational speed measured by the first measurement device is lower than a predetermined target rotational speed.

17. The hydraulic system for a working machine according to claim 9, wherein the prime mover includes an internal combustion engine drivable by combustion of injected fuel; and the electrical controller is configured or programmed to change the LS differential pressure, based on an injection amount of fuel to the internal combustion engine or a load factor of the internal combustion engine.

18. The hydraulic system for a working machine according to claim 9, further comprising:

a command generator, including an operation switch, to provide a command to change the LS differential pressure; wherein the electrical controller is configured or programmed to change the LS differential pressure such that the LS differential pressure is increased in response to a command being generated by the command member to change the LS differential pressure.

19. The hydraulic system for a working machine according to claim 9, further comprising:

an accelerator to set a rotational speed of the prime mover; wherein the electrical controller is configured or programmed to determine a set value of the rotational speed of the prime mover in accordance with an operating state of the accelerator, and change the LS differential pressure, based on the determined set value.

20. The hydraulic system for a working machine according to claim 9, further comprising:

a second measurement device to measure a temperature of at least one selected from a group consisting of the hydraulic fluid flowing through a flow path disposed in the working machine, cooling water flowing through a water passage disposed in the working machine, and oil of the prime mover; wherein the electrical controller is configured or programmed to change the LS differential pressure, based on the temperature measured by the second measurement device.

* * * * *